US012630992B2

(12) United States Patent
Burma

(10) Patent No.: US 12,630,992 B2
(45) Date of Patent: May 19, 2026

(54) SYSTEM AND METHOD OF RETROFITTING A LAGOON ENTRY SYSTEM TO A COVERED LAGOON

(71) Applicant: Bristola, LLC, Waukee, IA (US)

(72) Inventor: Jared Burma, Waukee, IA (US)

(73) Assignee: Bristola, LLC, Waukee, IA (US)

( * ) Notice: Subject to any disclaimer, the term of this patent is extended or adjusted under 35 U.S.C. 154(b) by 300 days.

(21) Appl. No.: 18/342,104

(22) Filed: Jun. 27, 2023

(65) Prior Publication Data

US 2024/0003114 A1     Jan. 4, 2024

Related U.S. Application Data

(60) Provisional application No. 63/356,597, filed on Jun. 29, 2022.

(51) Int. Cl.
| | |
|---|---|
| *B08B 13/00* | (2006.01) |
| *E02D 29/00* | (2006.01) |
| *E02D 29/045* | (2006.01) |
| *E02D 29/063* | (2006.01) |
| *F16L 1/028* | (2006.01) |

(52) U.S. Cl.
CPC .............. *E02D 29/10* (2013.01); *B08B 13/00* (2013.01); *E02D 29/045* (2013.01); *E02D 29/063* (2013.01); *F16L 1/028* (2013.01)

(58) Field of Classification Search
CPC ..... E02D 29/10; E02D 29/045; E02D 29/063; B08B 13/00; F16L 1/028
See application file for complete search history.

(56) References Cited

U.S. PATENT DOCUMENTS

| | | | | |
|---|---|---|---|---|
| 4,366,846 A | * | 1/1983 | Curati, Jr. ............. | E01B 19/006 |
| | | | | 405/36 |
| 4,394,136 A | * | 7/1983 | Grabis ...................... | C02F 3/28 |
| | | | | 435/801 |
| 4,616,955 A | * | 10/1986 | Wallace ................... | H02G 1/10 |
| | | | | 405/154.1 |
| 4,682,492 A | * | 7/1987 | Green ................... | B65D 90/24 |
| | | | | 73/40.5 R |
| 5,642,745 A | * | 7/1997 | Landry ................... | B08B 9/051 |
| | | | | 134/167 R |
| 6,206,612 B1 | * | 3/2001 | Meyer ...................... | A01C 3/02 |
| | | | | 405/36 |
| 2020/0261950 A1 | * | 8/2020 | Burma ...................... | B08B 9/38 |
| 2020/0352405 A1 | * | 11/2020 | Burma ............... | A47L 11/4013 |

* cited by examiner

*Primary Examiner* — Benjamin F Fiorello
(74) *Attorney, Agent, or Firm* — Christopher A. Proskey; BrownWinick Law Firm

(57)     ABSTRACT

In one or more arrangements, a lagoon entry system and method of retrofitting a lagoon entry system to a covered lagoon is presented. In one or more arrangements, the lagoon entry system includes a center wall connected to an interior portion, an exterior portion, and a gate complex. The gate complex includes a gate which is configured to provide selective access into the covered lagoon, namely access by a submersible robot cleaner configured to clean the floor of the covered lagoon. In one or more arrangements, the lagoon entry system is retrofitted to a covered lagoon by cutting a hole in the cover of the covered lagoon, excavating material from an interior area located inside the covered lagoon and an exterior area located outside the lagoon. Once the interior area and exterior area have been excavated, the center wall, interior portion, and exterior portion can be placed and properly connected.

33 Claims, 25 Drawing Sheets

SYSTEM AND METHOD OF RETROFITTING A LAGOON ENTRY SYSTEM TO A COVERED LAGOON

REFERENCE TO RELATED APPLICATIONS

This application claims priority to U.S. Provisional Patent Application 63/356,597, filed Jun. 29, 2022, and entitled "SYSTEM AND METHOD OF RETROFITTING A LAGOON ENTRY SYSTEM TO A COVERED LAGOON," and relates to U.S. patent application Ser. No. 16/868,140 entitled "RETROFIT BOX SYSTEM FOR CLEANING INACCESSIBLE FLOORS" filed May 6, 2020, and U.S. patent application Ser. No. 17/648,636 entitled "AUGER CLEANED INACCESSIBLE FLOOR SYSTEM" filed Jan. 21, 2022, each of which are incorporated by reference in their entireties.

FIELD OF THE DISCLOSURE

This disclosure relates to the removal of waste material from floors. More specifically, this disclosure relates to a lagoon entry system which allows for a submersible robot cleaner to be inserted into and subsequently removed from covered lagoons without allowing gasses to escape the covered lagoons.

OVERVIEW OF THE DISCLOSURE

Removal of waste material from floors that are inaccessible during operation (inaccessible floors) conventionally requires halting operations to remove the waste material. For example, a floor may be inaccessible due to coverage with liquid, such as the floor of a covered anaerobic lagoon.

For optimal performance of a covered lagoon, waste accumulation on the inaccessible floor of the covered lagoon may be removed. Waste accumulates on the inaccessible floor under normal operating conditions. For example, with respect to inaccessible floors of covered lagoons, the process of anaerobic digestion produces waste. During anaerobic digestion microorganisms (e.g., acetogenic bacteria, archaea) breakdown organic matter into biogas (e.g., methane, carbon dioxide) and solid and liquid digested material (e.g., waste) having elemental nutrients, such as nitrogen, phosphorus, and/or potassium. Biogas is used as a fuel for combustion and energy production. The waste may be further processed for other uses (e.g., fertilizer), may be recycled back into the digester, and/or may be discarded.

As anaerobic digestion is carried out in the closed system of a covered anaerobic lagoon that is sealed from the presence of oxygen, the covered lagoon fills with waste. This leads to reduced volume for anaerobic digestion to take place, with volume for anaerobic digestion reducing continuously as anaerobic digestion continues. Eventually covered lagoons require cleaning to remove the waste to maximize volume for anaerobic digestion to take place and to maintain the health of the microorganisms carrying out anaerobic digestion.

Conventional methods for cleaning covered lagoons typically require manual cleaning, whereby production is first shut down, and the covered lagoon is vented and drained. After venting and draining, manual cleaning requires that a human enter the lagoon to assist raking digested contents toward a vacuum where they can be removed. This manual process is both time consuming and hazardous.

The manual process of cleaning a covered lagoon can take at least two weeks, with additional time required to re-seed the lagoon with microorganisms to restart anaerobic digestion. Not only does production cease all together during this cleaning period, but because cleaning requires shutting down the entire digester operation, lagoons tend to be cleaned less frequently. Less frequent cleaning means that covered lagoons operate at sub-optimal volume.

The manual process of cleaning a covered lagoon is hazardous for humans. Venting the covered lagoon requires releasing explosive and hazardous gasses that may be poisonous to humans (sulfuric acid and ammonia). Moreover, it is dangerous to put a human in a covered lagoon, as they may encounter hazards in a confined space handling mechanical equipment.

Therefore, for all the reasons stated above, and the reasons stated below, there is a need in the art for an improved lagoon entry system which allows for the cleaning of a covered lagoon without having to cease production or place humans in a hazardous environment. Thus, it is a primary objective of the disclosure to provide a lagoon entry system that improves upon the state of the art.

Another objective of the disclosure is to provide a lagoon entry system which is safe to operate.

Yet another objective of the disclosure is to provide a lagoon entry system which is relatively easy to build.

Another objective of the disclosure is to provide a lagoon entry system which is relatively cost friendly to build.

Yet another objective of the disclosure is to provide a lagoon entry system which can be built relatively quickly and efficiently.

Another objective of the disclosure is to provide a lagoon entry system which is easy to operate.

Yet another objective of the disclosure is to provide a lagoon entry system which is relatively cost friendly to manufacture.

Another objective of the disclosure is to provide a lagoon entry system which is relatively easy to transport for installation.

Yet another objective of the disclosure is to provide a lagoon entry system which is aesthetically appealing.

Another objective of the disclosure is to provide a lagoon entry system which is robust.

Yet another objective of the disclosure is to provide a lagoon entry system which does not allow gasses to escape the covered lagoon.

Another objective of the disclosure is to provide a lagoon entry system which is relatively inexpensive.

Yet another objective of the disclosure is to provide a lagoon entry system which is not easily susceptible to wear and tear.

Another objective of the disclosure is to provide a lagoon entry system which has a long useful life.

Yet another objective of the disclosure is to provide a lagoon entry system which is efficient to use and operate.

These and other objects, features, or advantages of the disclosure will become apparent from the specification, figures, and claims.

SUMMARY OF THE DISCLOSURE

In one or more arrangements, a lagoon entry system and method of retrofitting a lagoon entry system to a covered lagoon is presented. In one or more arrangements, the lagoon entry system includes a center wall connected to an interior portion, an exterior portion, and a gate complex. In this arrangement, the gate complex includes a gate which is configured to provide selective access into the covered lagoon, namely access by a submersible robot cleaner configured to clean the floor of the covered lagoon. In one or more arrangements, the lagoon entry system is retrofitted to a covered lagoon by cutting a hole in the cover of the covered lagoon, excavating material from an interior area located inside the covered lagoon and an exterior area located outside the lagoon. Once the interior area and exterior area have been excavated, the center wall, interior portion, and exterior portion can be placed and properly connected.

BRIEF DESCRIPTION OF THE FIGURES

The figures show one or more arrangements described herein.

DETAILED DESCRIPTION OF THE DISCLOSURE

Figure 1:
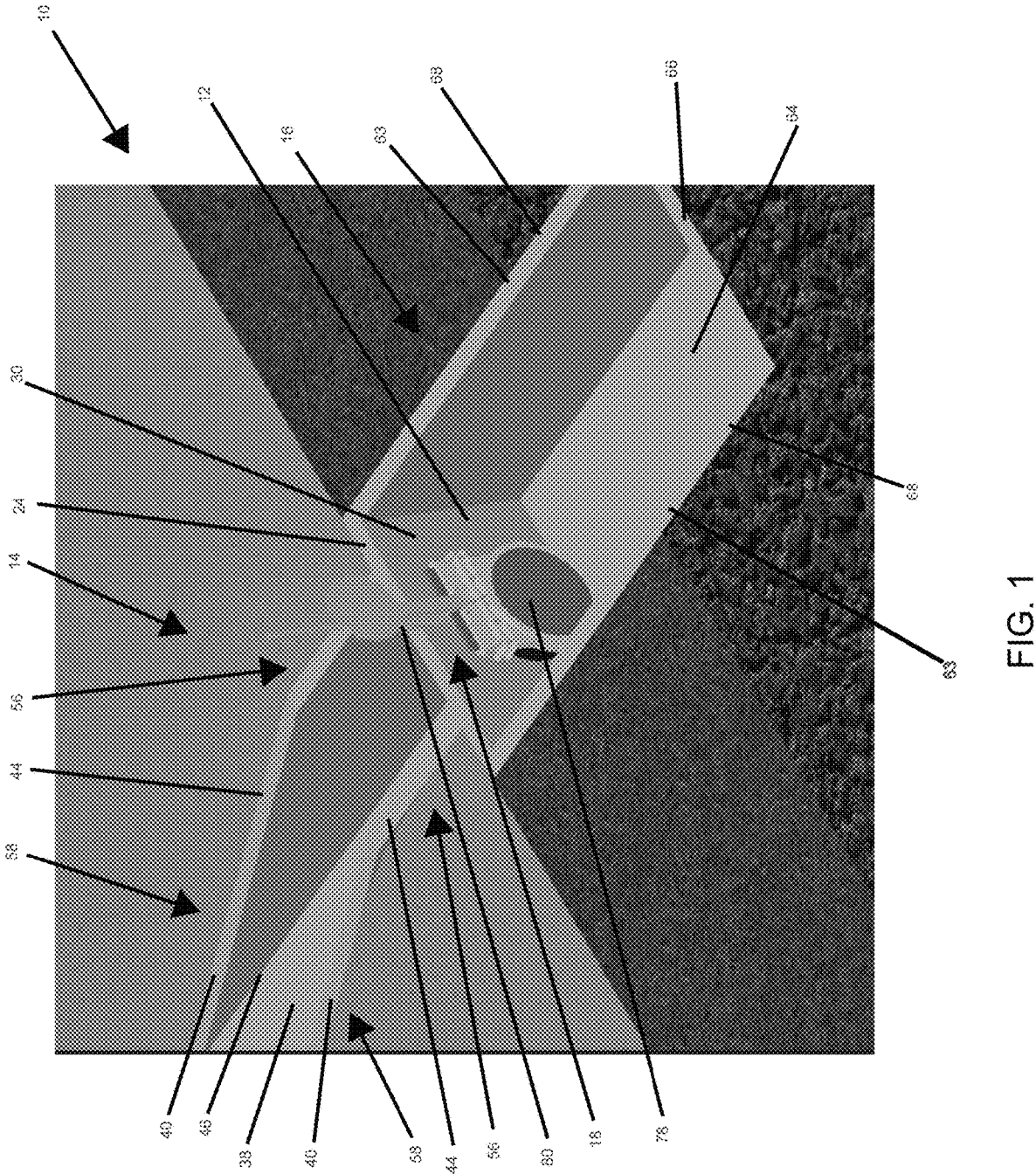
FIG. 1 shows a perspective view of an embodiment of a lagoon entry system with the lagoon cover removed for ease of reference.
Figure 2:
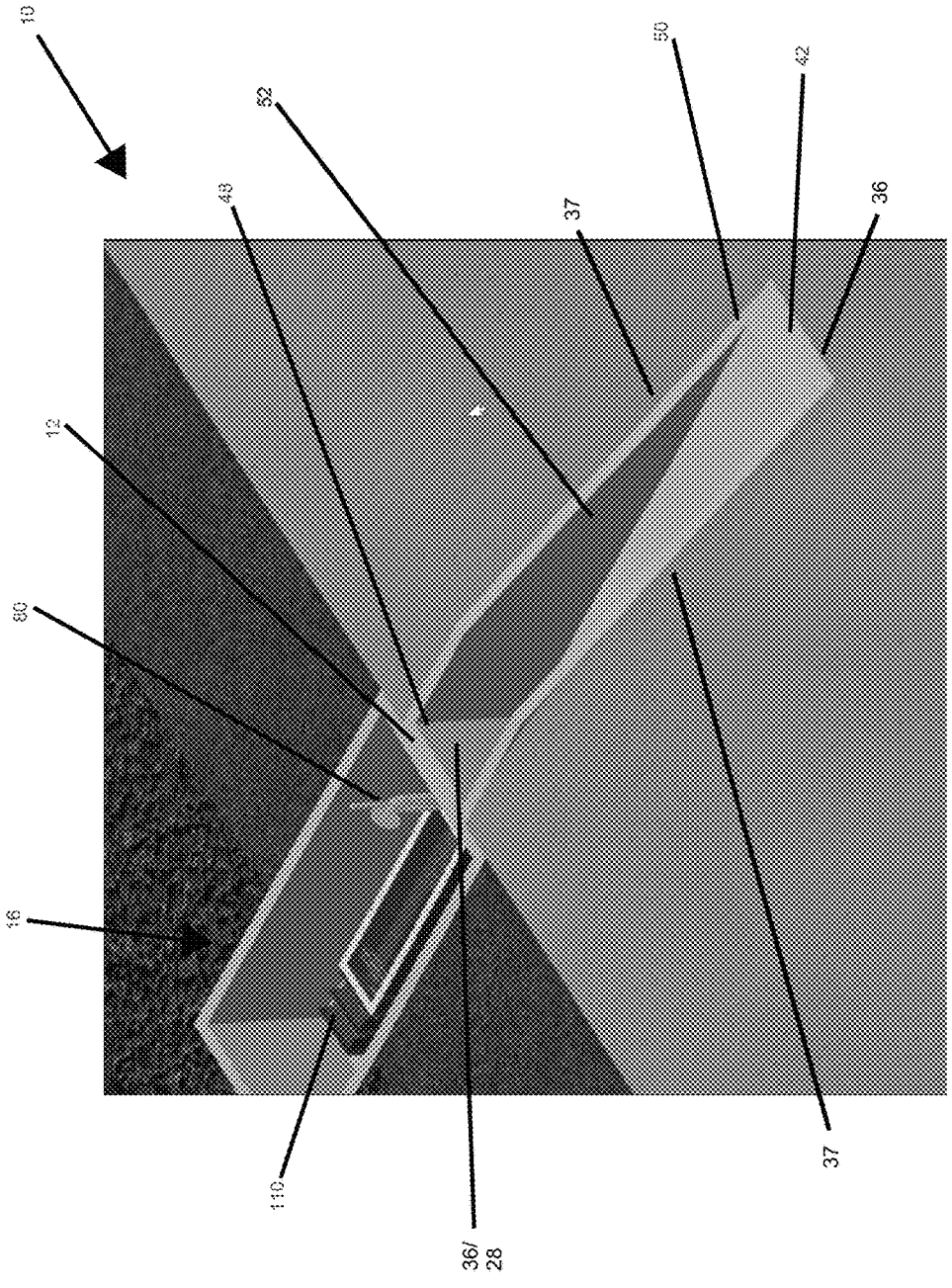
FIG. 2 shows a perspective view of an embodiment of the lagoon entry system with the cover removed and a chamber placed within the exterior portion of the lagoon entry system.
Figure 3:
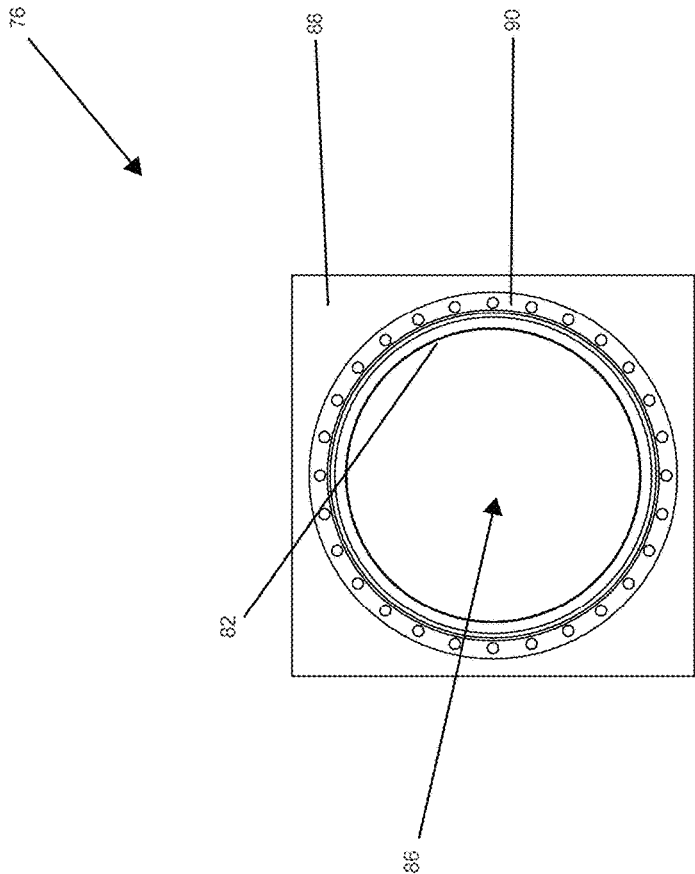
FIG. 3 shows a front elevation view of a conduit of an embodiment of the lagoon entry system.
Figure 4:
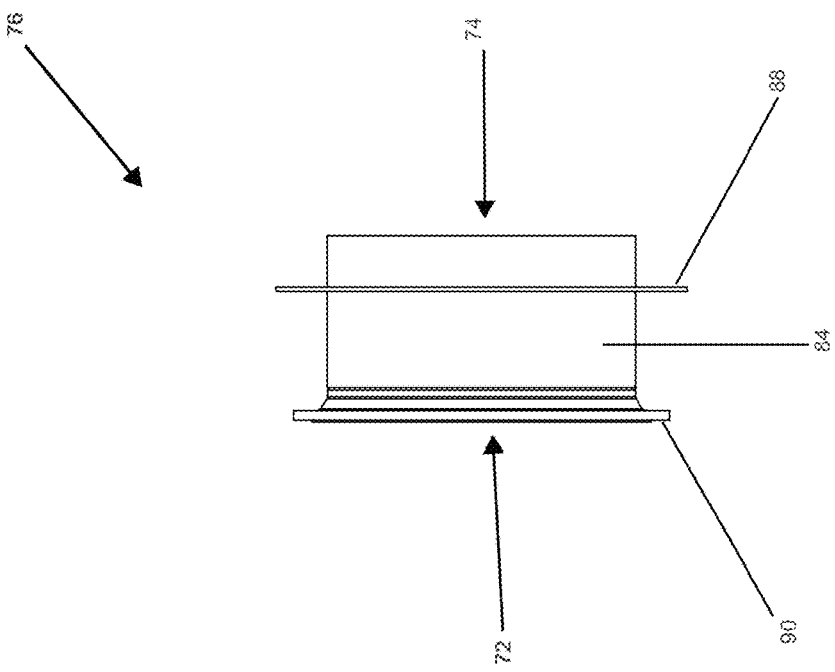
FIG. 4 shows a side elevation view of a conduit of an embodiment of the lagoon entry system.
Figure 5:
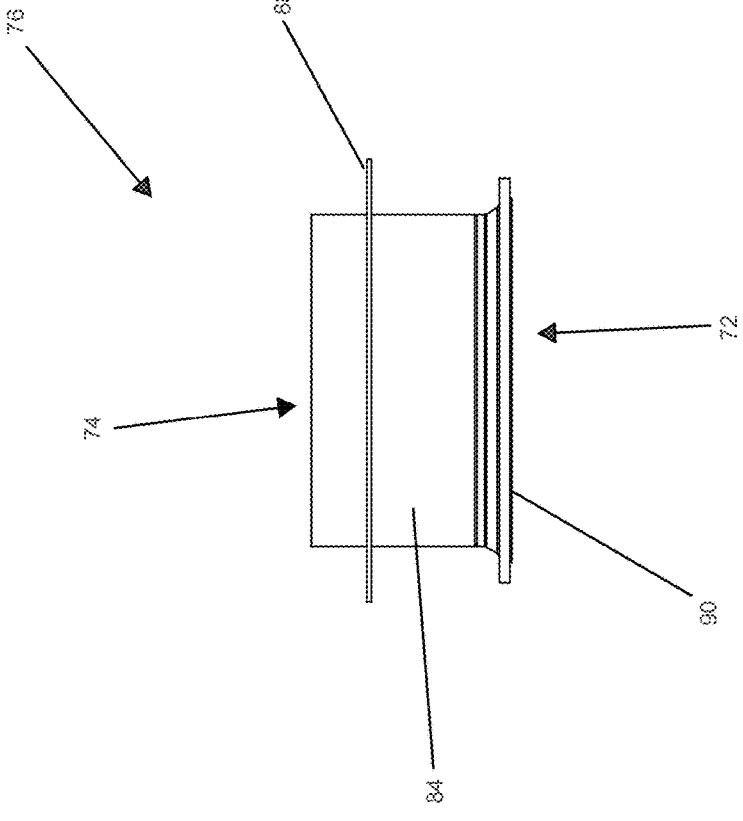
FIG. 5 shows a top plan view of a conduit of an embodiment of the lagoon entry system.
Figure 6:
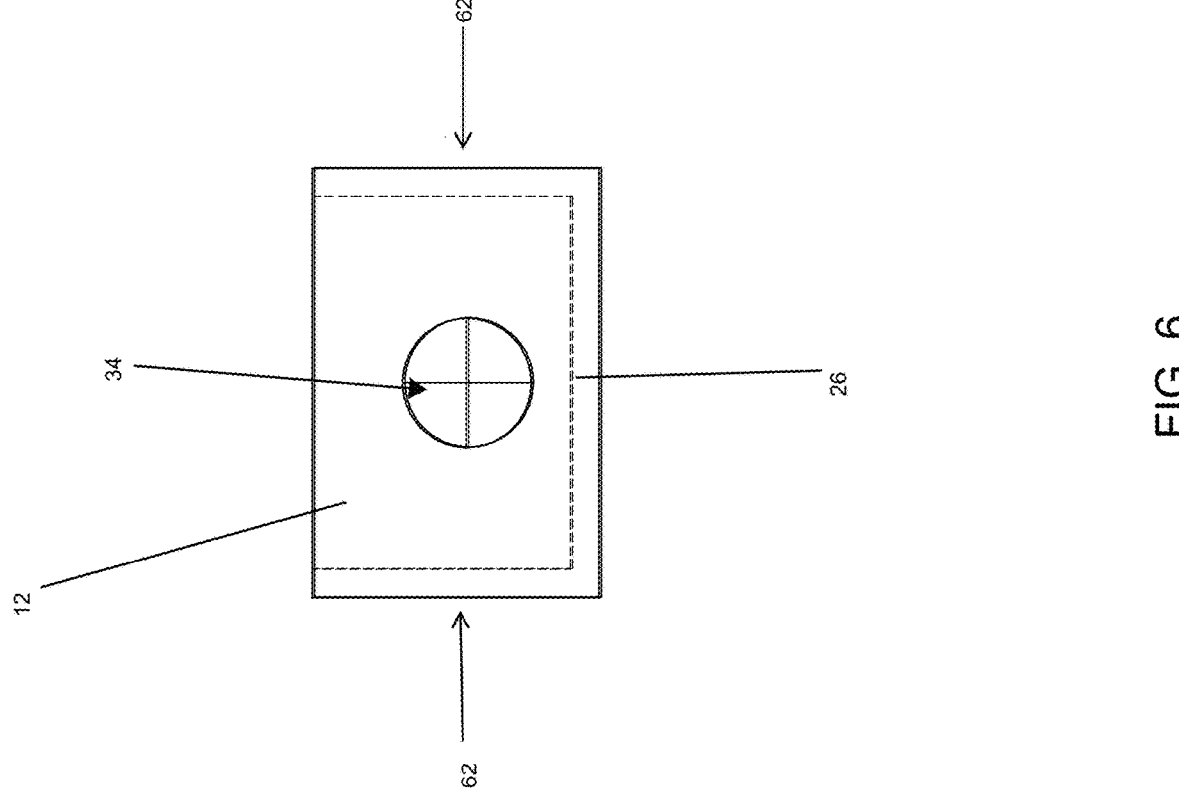
FIG. 6 shows an end-on view of the exterior portion of an embodiment of the lagoon entry system.
Figure 7:
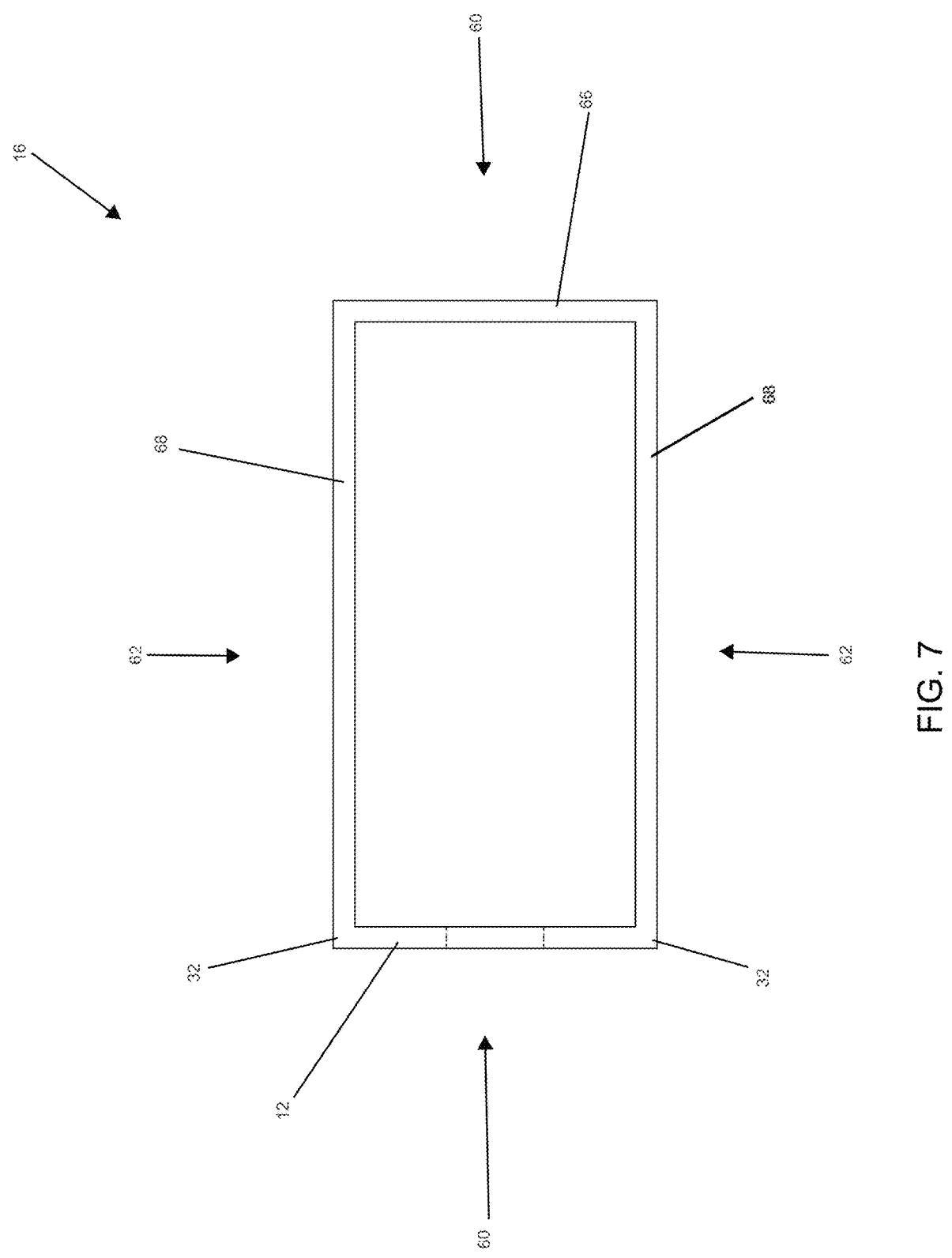
FIG. 7 shows a top plan view of the exterior portion of an embodiment of the lagoon entry system.
Figure 8:
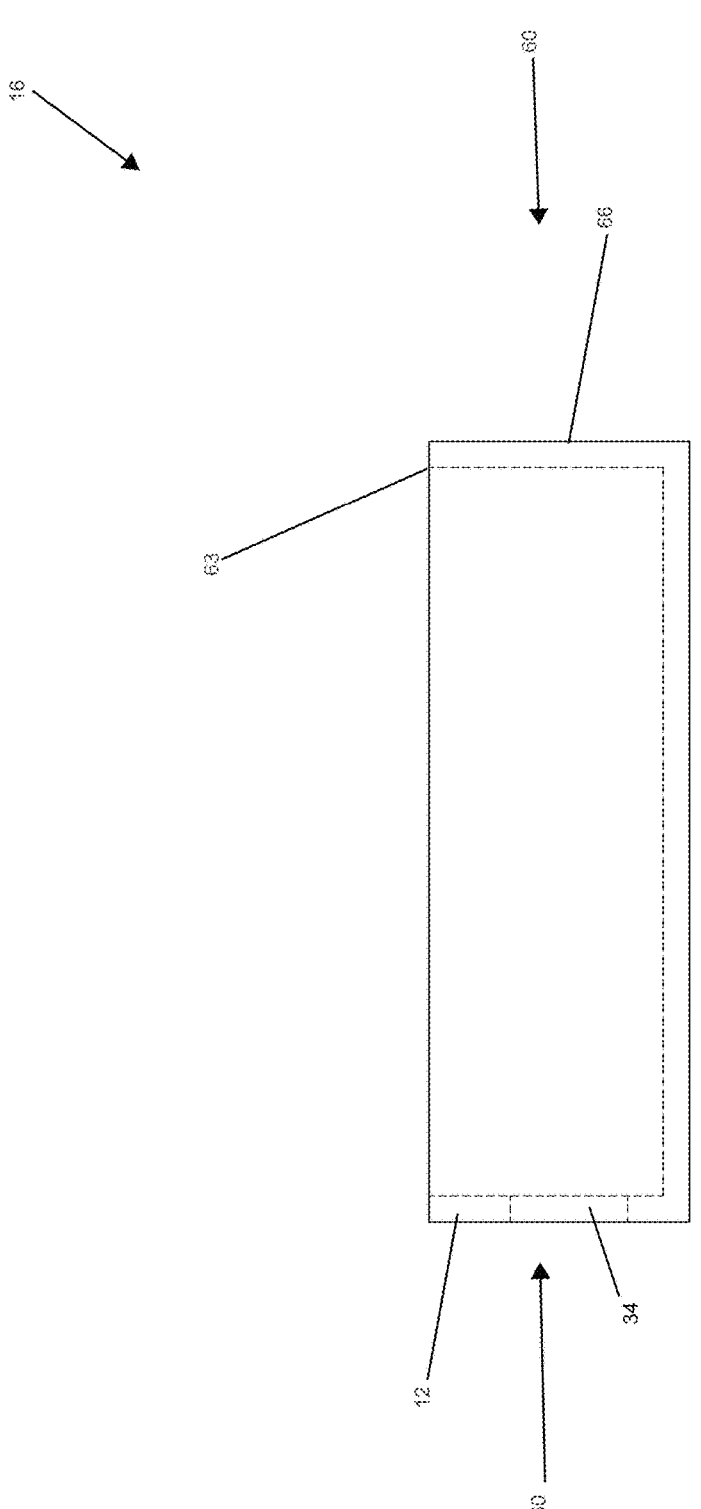
FIG. 8 shows a side elevation view of the exterior portion of an embodiment of the lagoon entry system.
Figure 9:
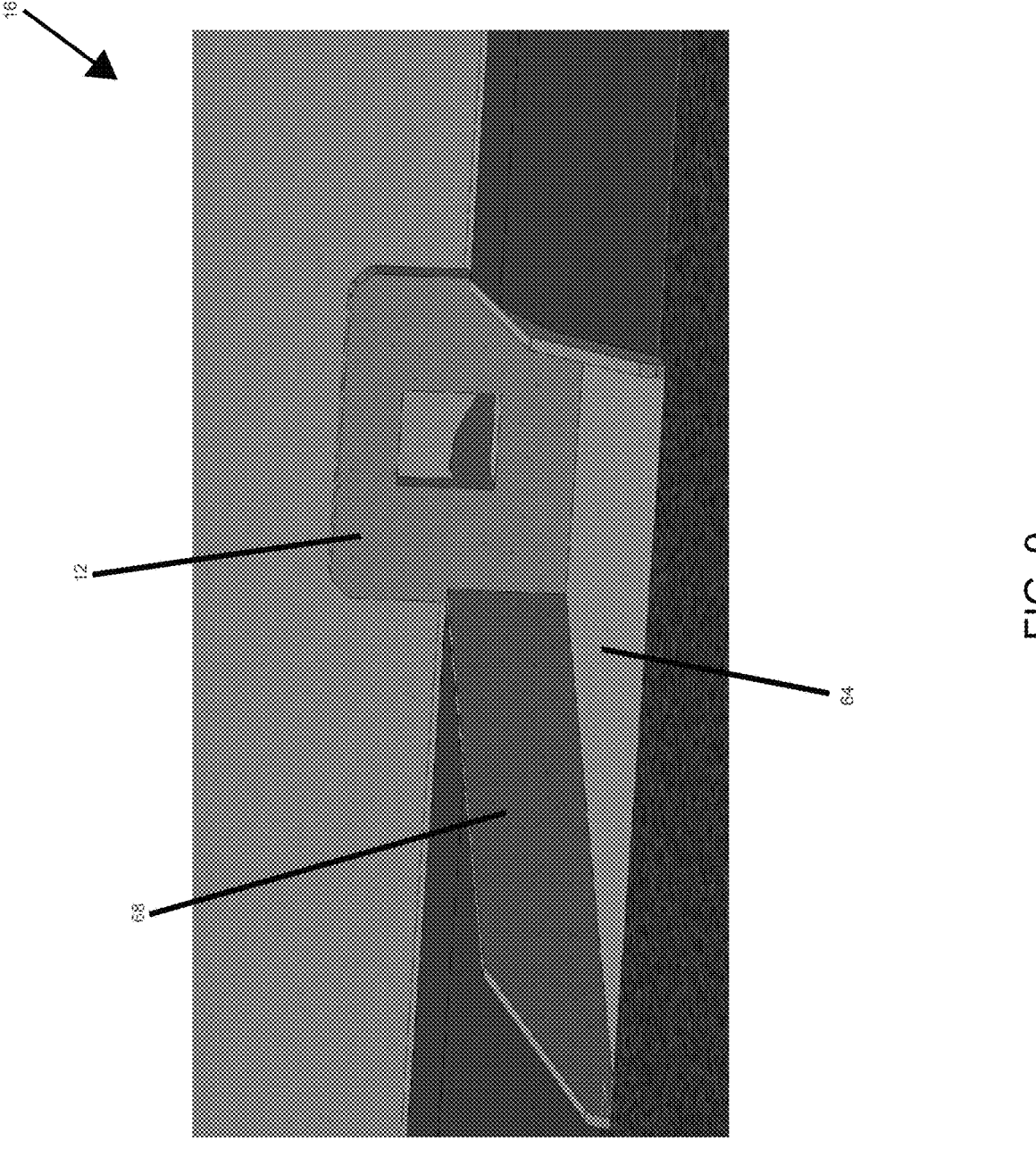
FIG. 9 shows a view of the exterior portion of another embodiment of the lagoon entry system including a ramp area for ease of access for a truck trailer.
Figure 10:
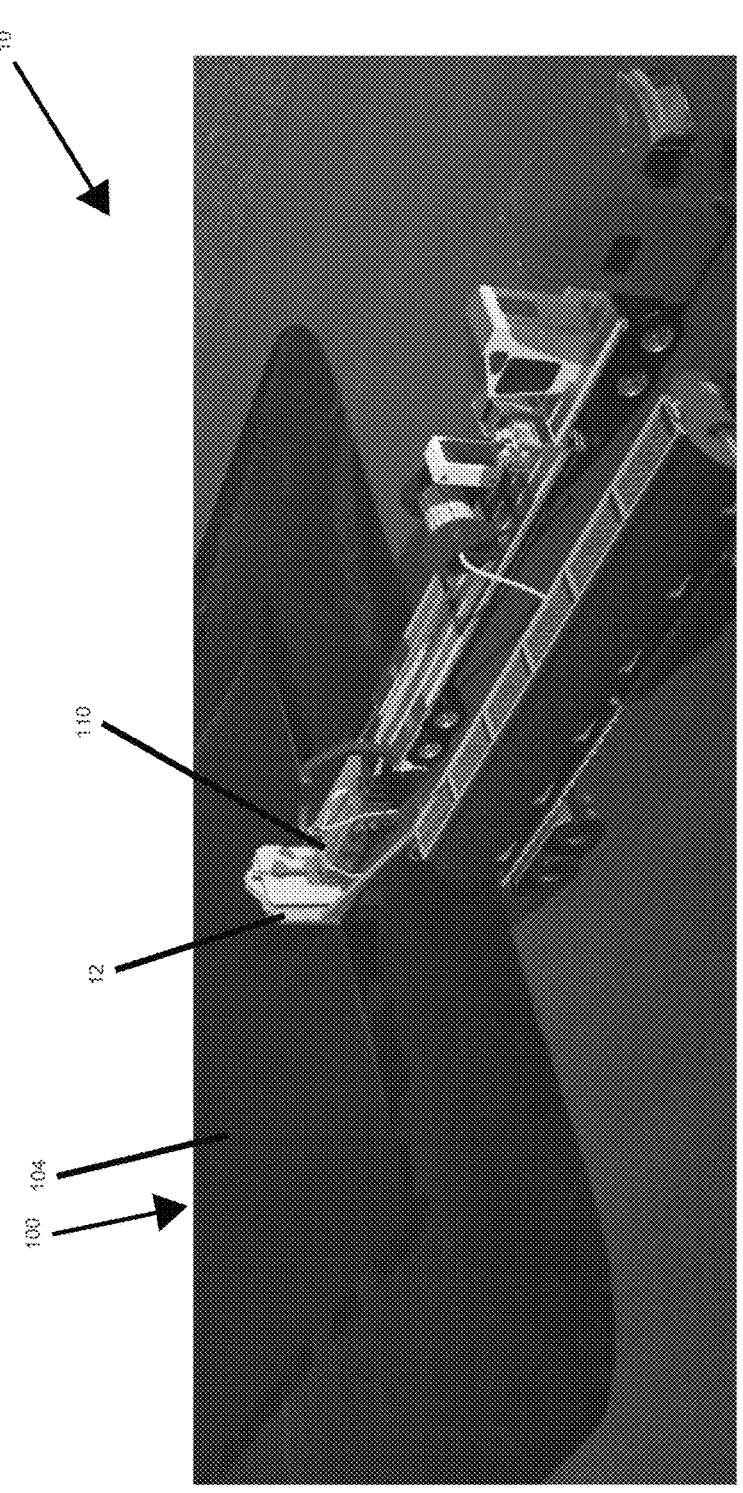
FIG. 10 shows a perspective view of the exterior of an embodiment of the lagoon entry system with a truck trailer backed onto the ramp and the chamber hooked up to the center wall.
Figure 11:
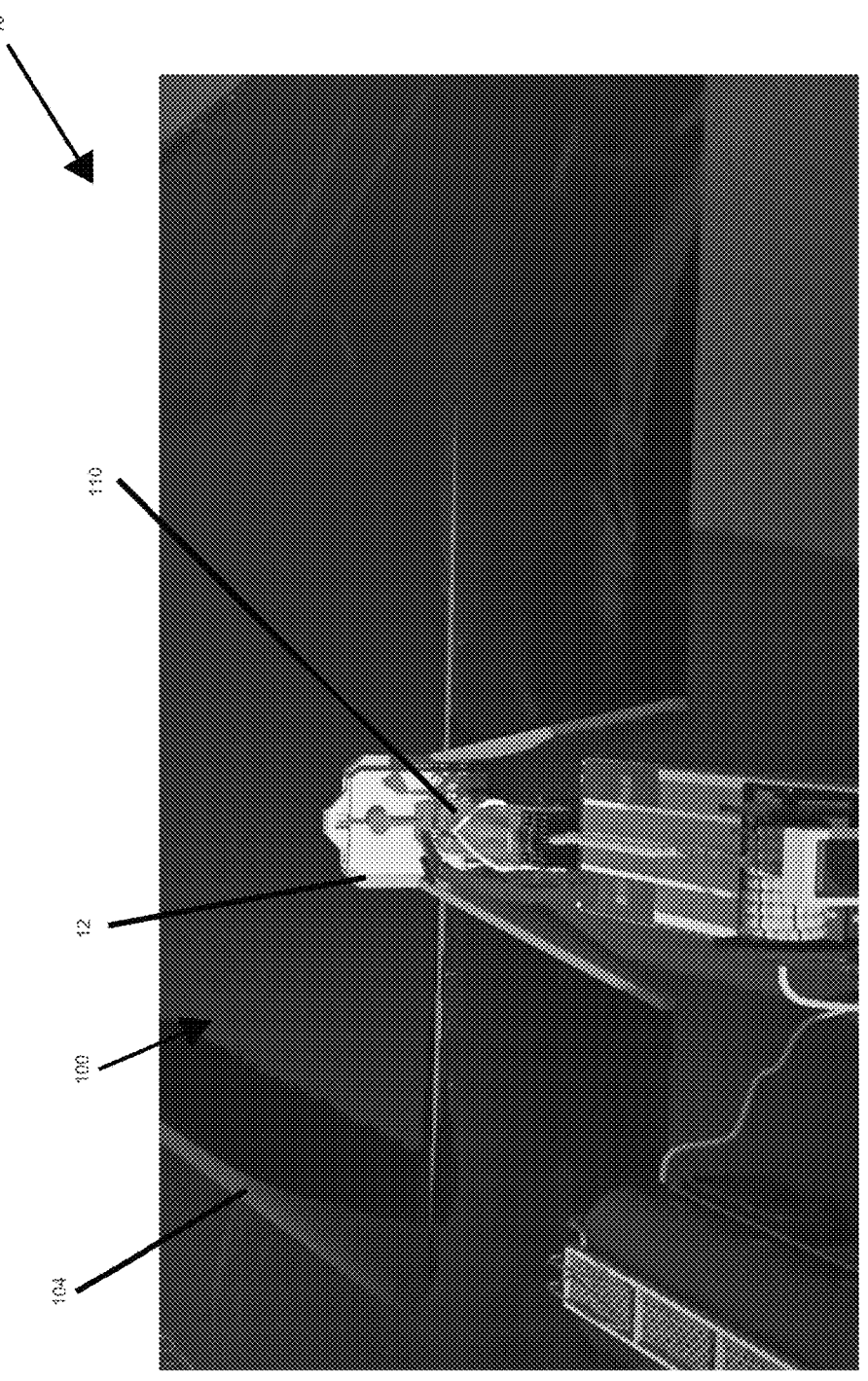
FIG. 11 shows an elevated front view of the exterior of an embodiment of the lagoon entry system with a truck trailer backed onto the ramp and the chamber hooked up to the center wall.
Figure 12:
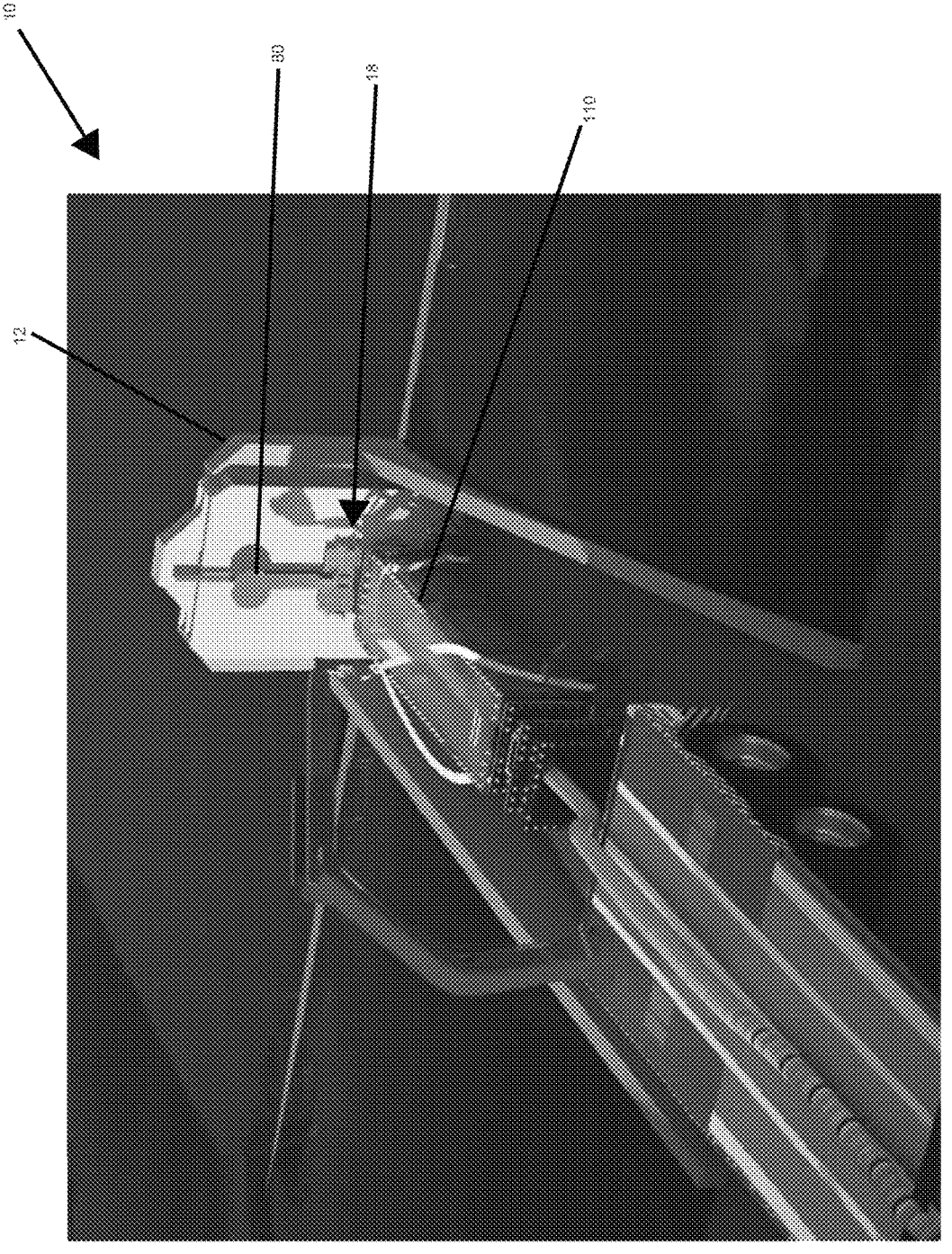
FIG. 12 shows a rear facing perspective view of the truck trailer and chamber of an embodiment of the lagoon entry system attached to the center wall in preparation for the robot cleaner to enter the lagoon.
Figure 13:
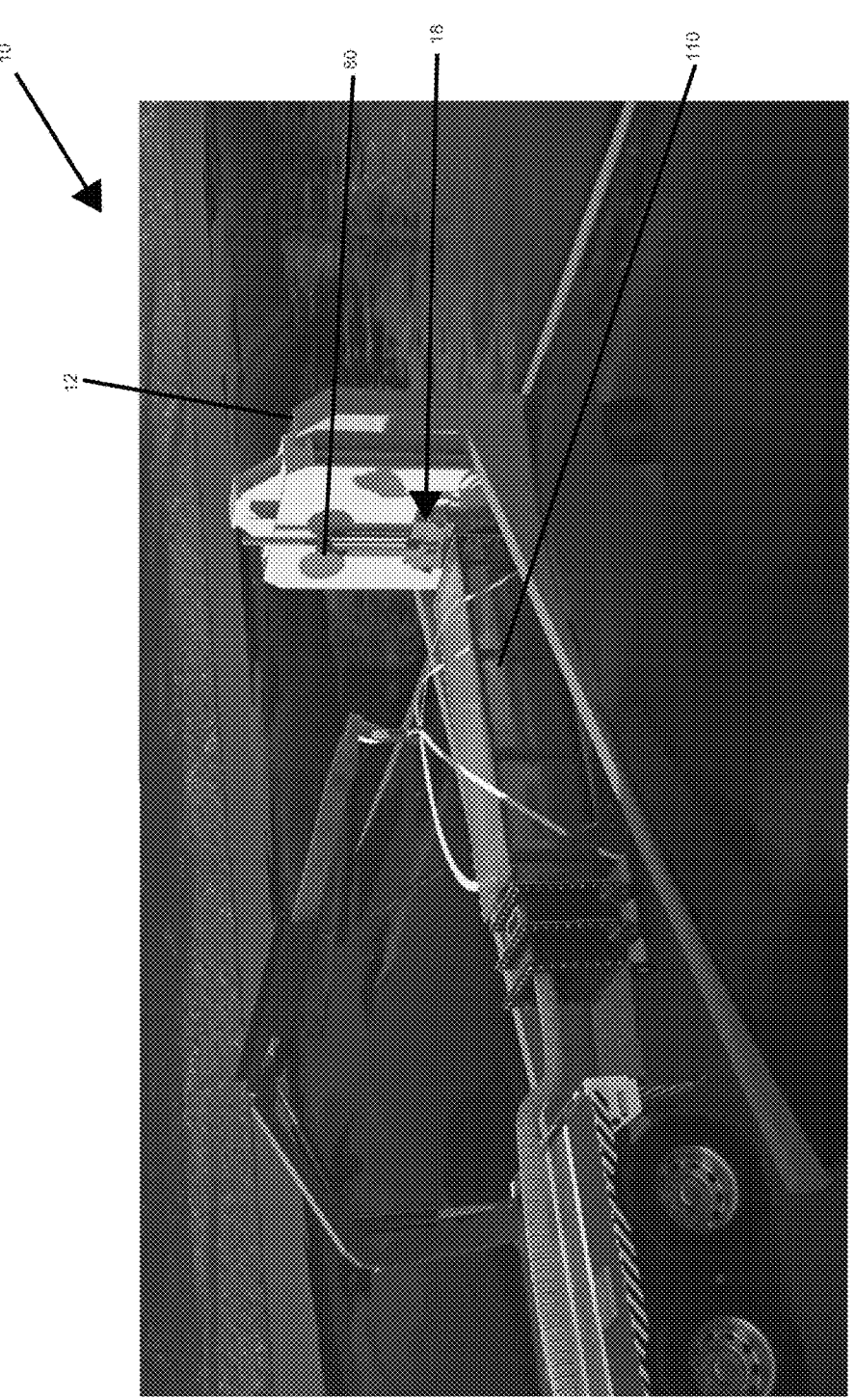
FIG. 13 shows an elevated side perspective view of the truck trailer and chamber of an embodiment of the lagoon entry system attached to the center wall in preparation for the robot cleaner to enter the lagoon.
Figure 14:
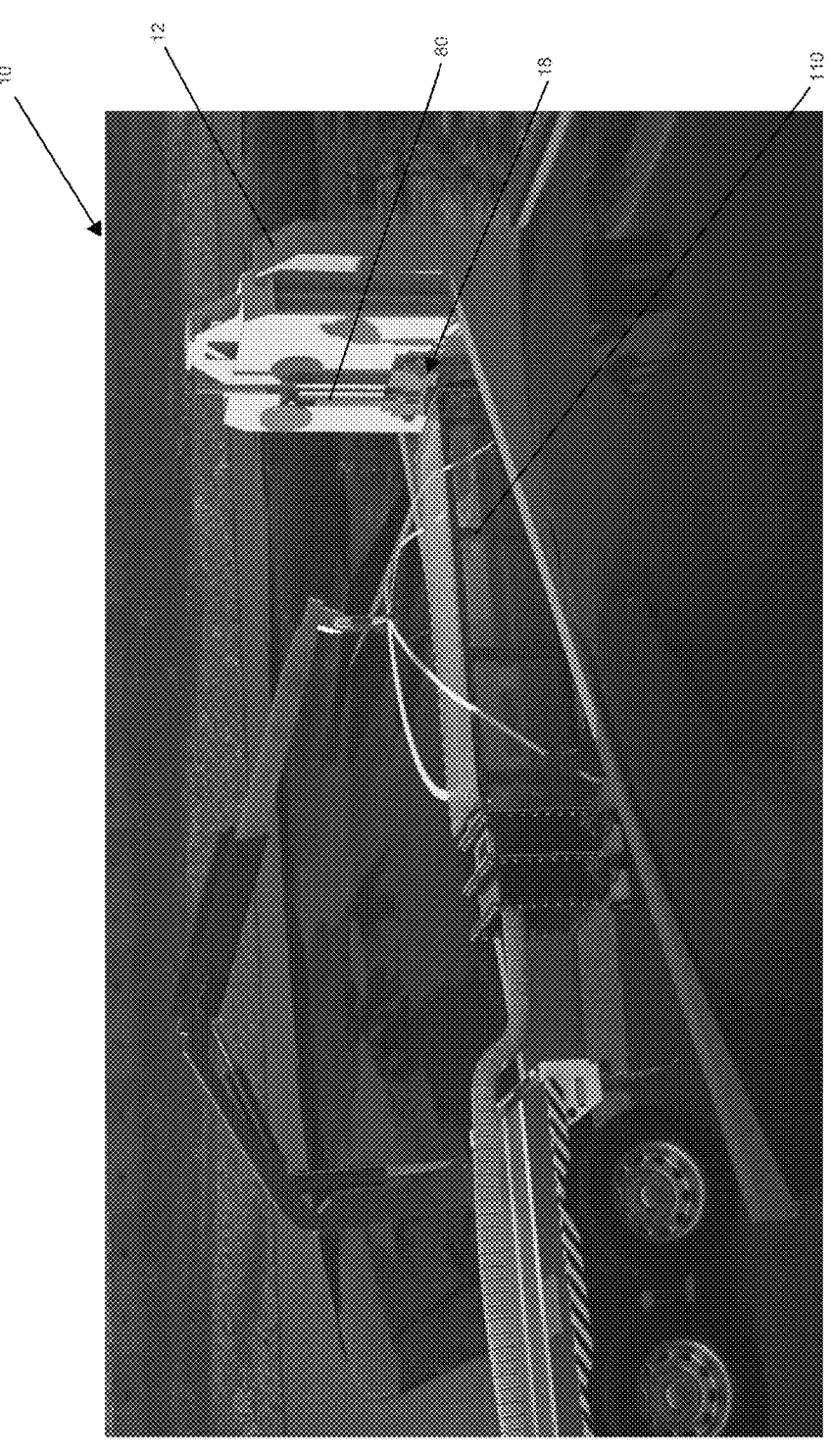
FIG. 14 shows another elevated side perspective view of the truck trailer and chamber of an embodiment of the lagoon entry system attached to the center wall in preparation for the robot cleaner to enter the lagoon.
Figure 15:
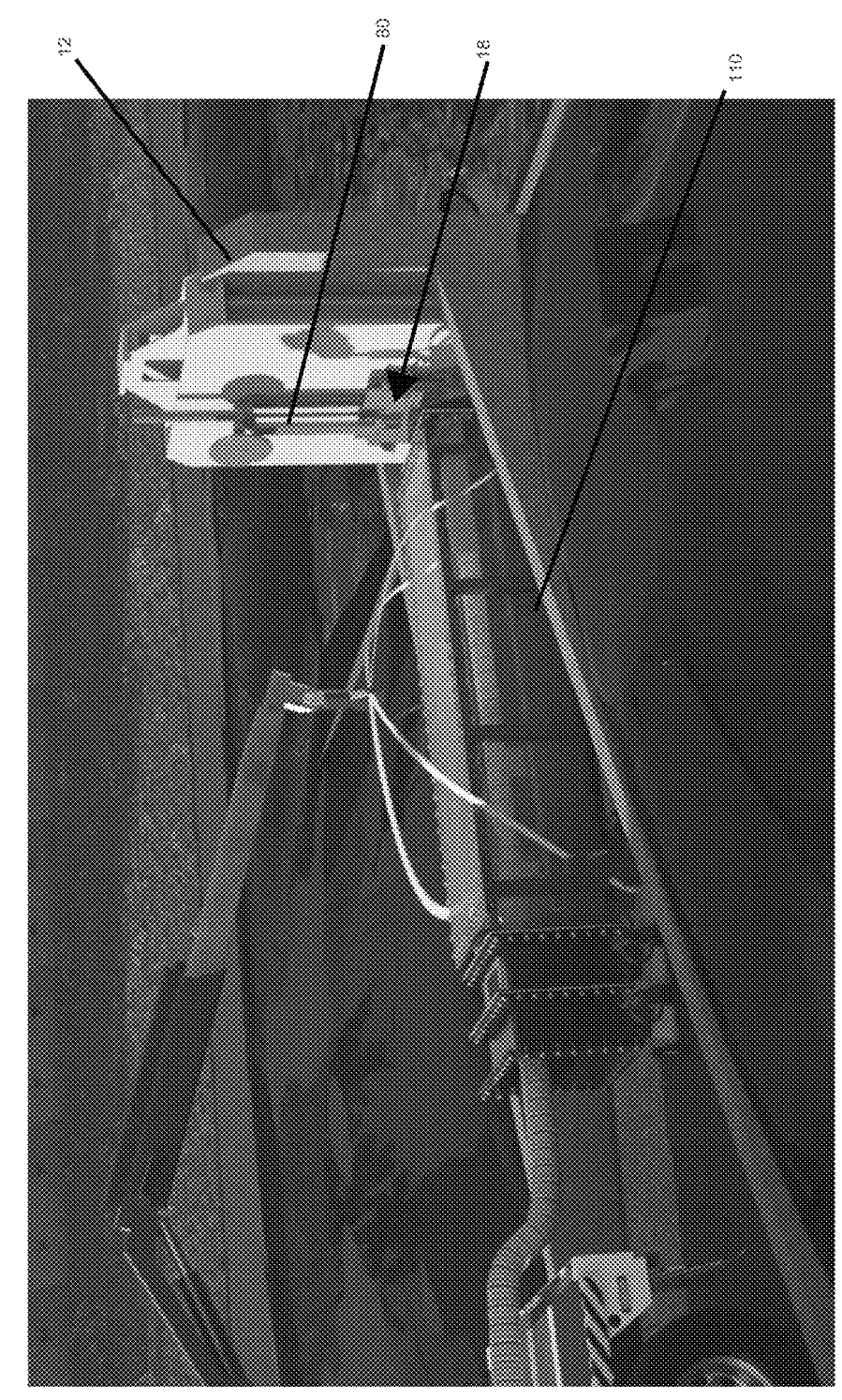
FIG. 15 shows an elevated side perspective view of the truck trailer and chamber of an embodiment of the lagoon entry system attached to the center wall as the robot cleaner enters the lagoon.
Figure 16:
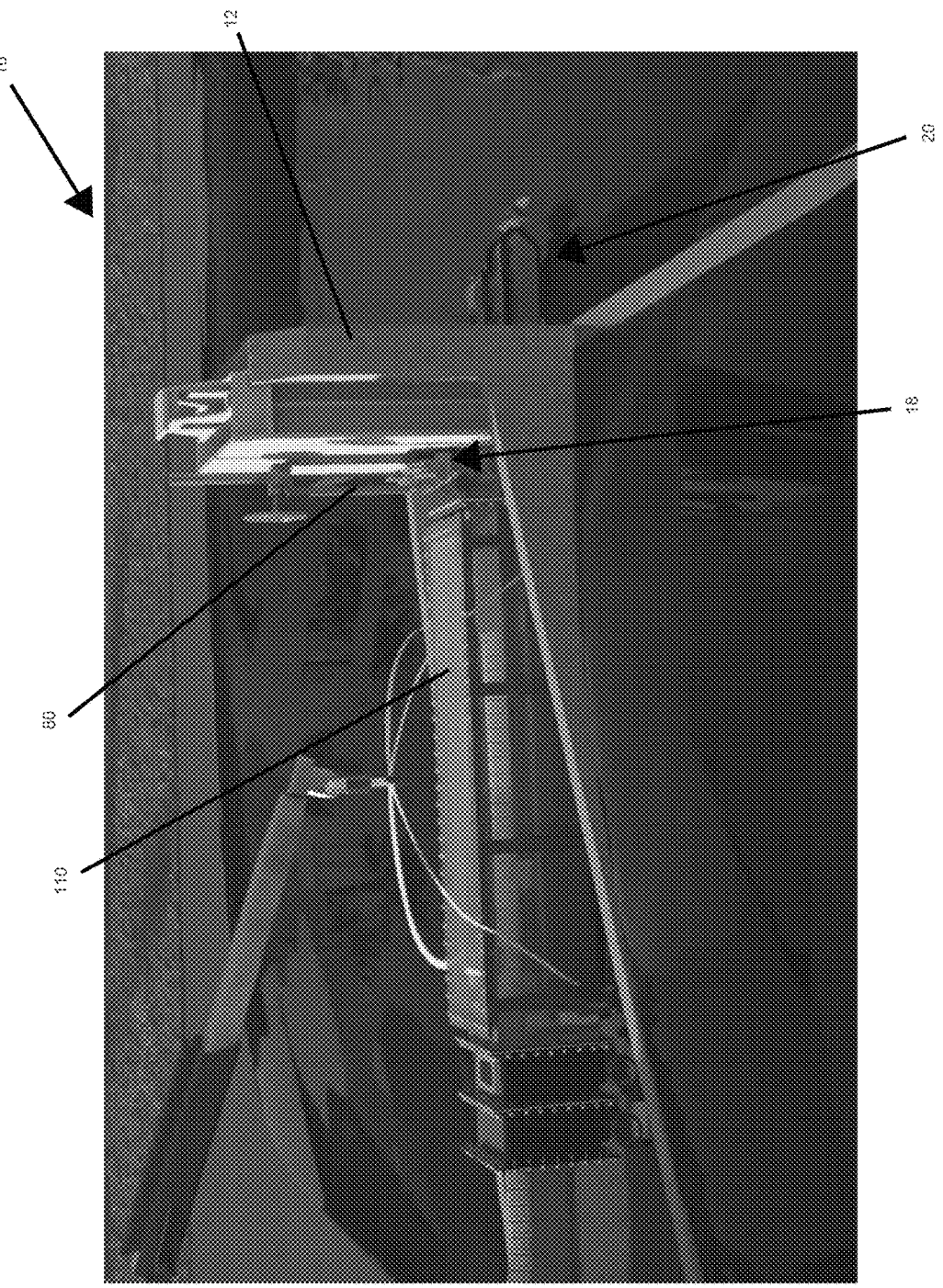
FIG. 16 shows an elevated side view of the chamber of an embodiment of the lagoon entry system attached to the center wall as the robot cleaner enters the lagoon with the cover of the lagoon removed for convenience.
Figure 17:
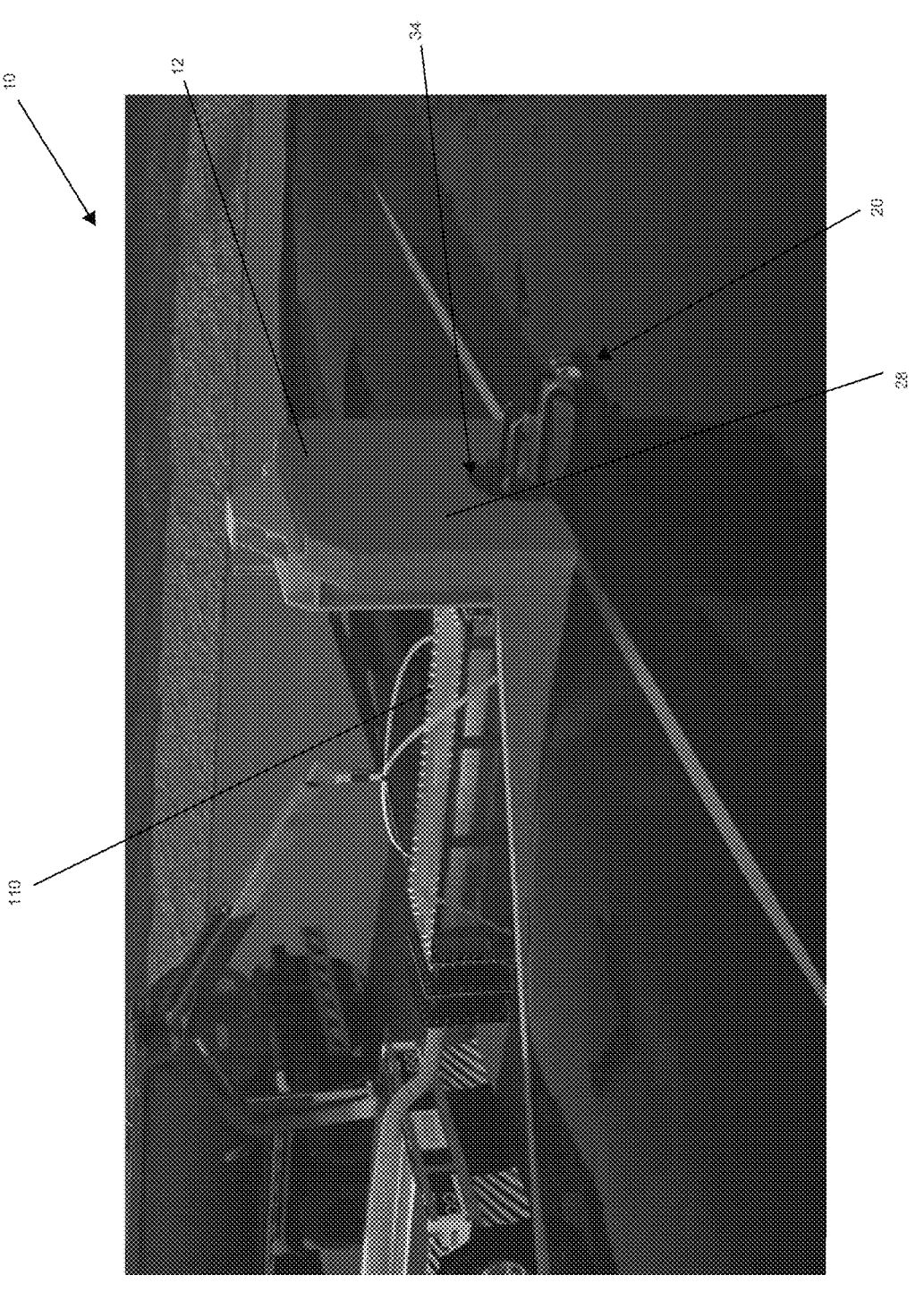
FIG. 17 shows an interior elevated side view of the chamber of an embodiment of the lagoon entry system attached to the center wall as the robot cleaner enters the lagoon with the cover of the lagoon removed for convenience.
Figure 18:
FIG. 18 shows an elevated interior view of the lagoon, the chamber, and the truck trailer of an embodiment of the lagoon entry system as the robot cleaner enters the lagoon with the cover of the lagoon removed for convenience.
Figure 19:
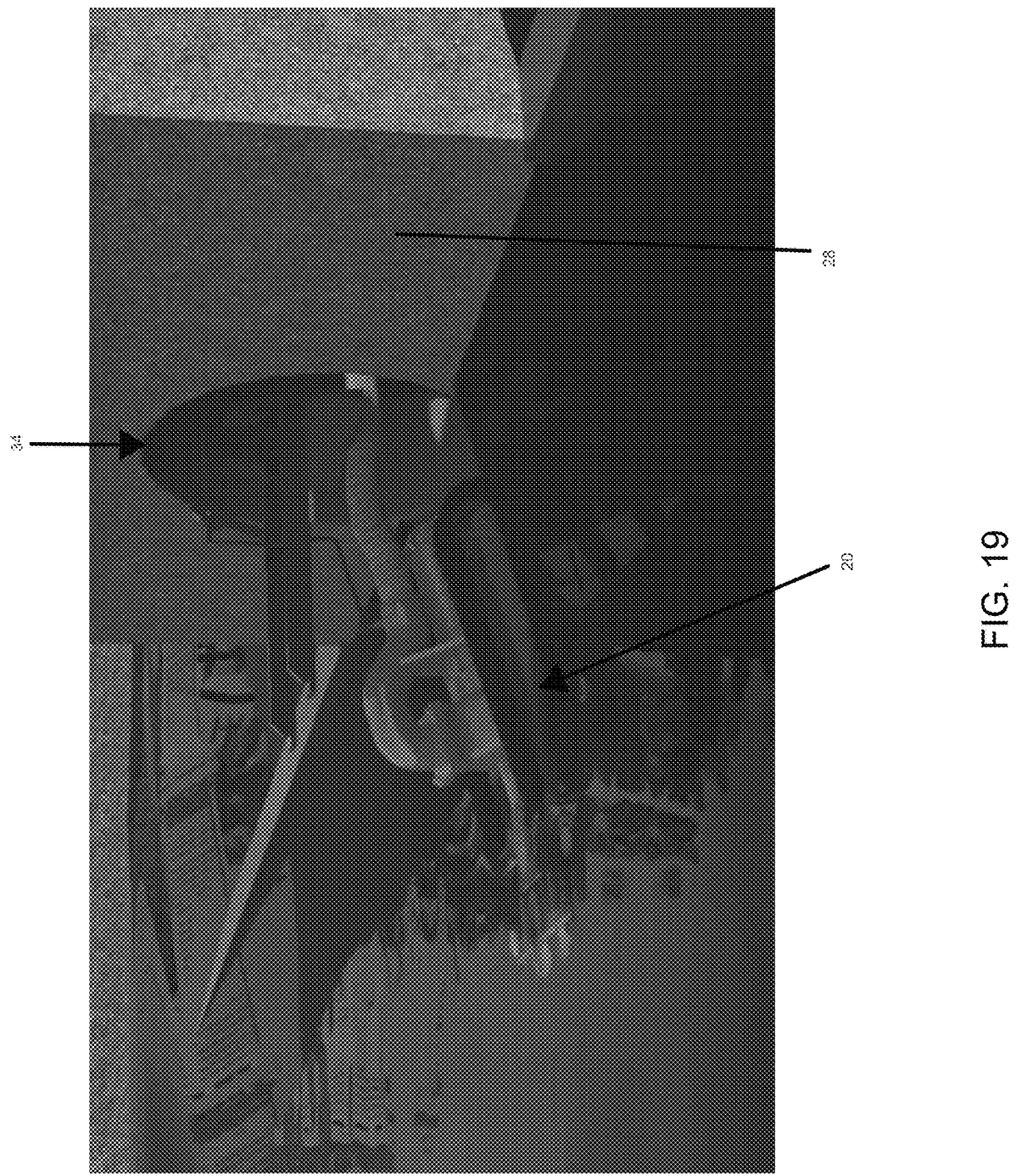
FIG. 19 shows an interior view of an embodiment of the lagoon entry system center wall as the robot cleaner enters the lagoon through the opening in the center wall.
Figure 20:
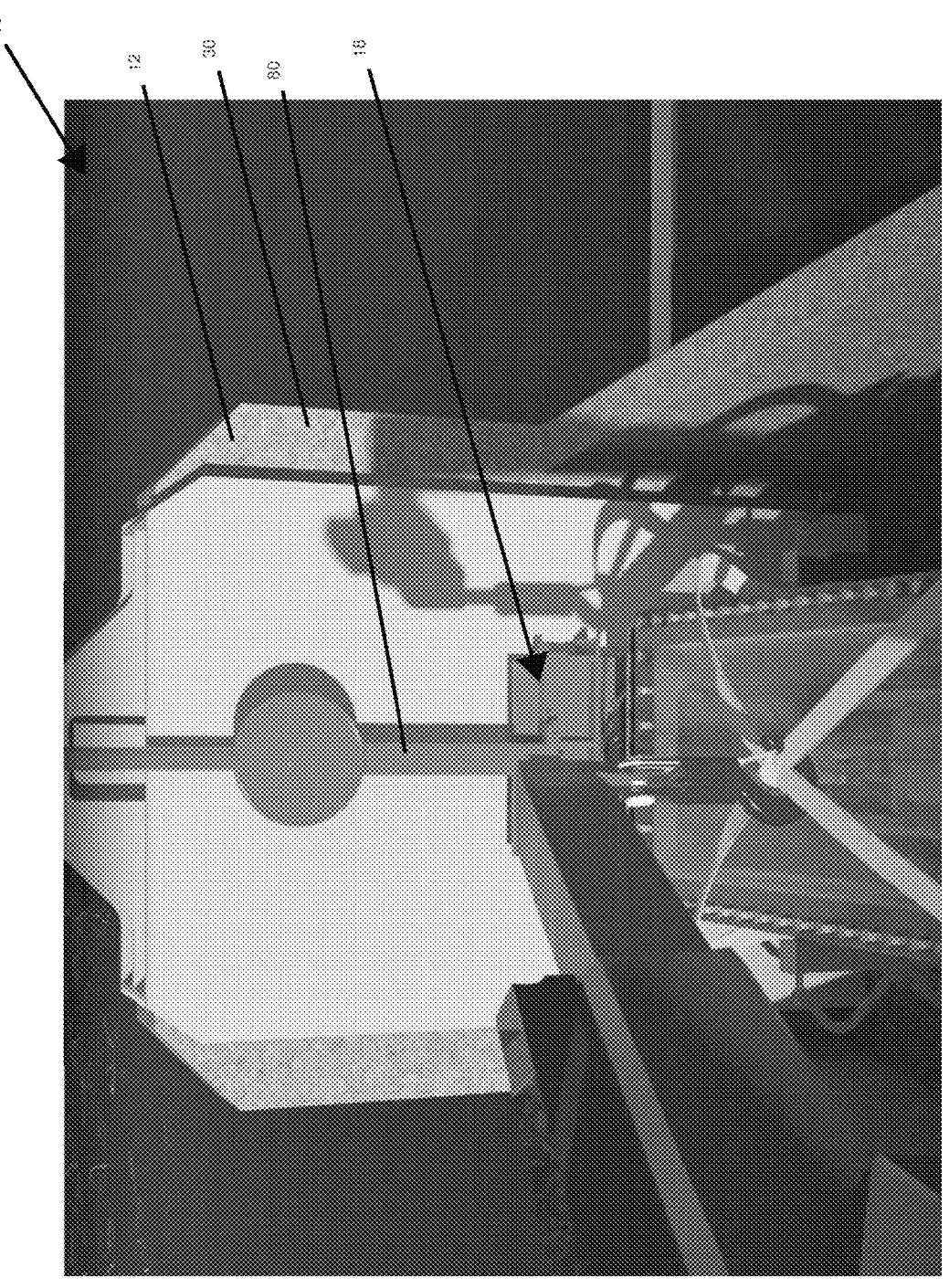
FIG. 20 shows an elevated front view of the chamber of an embodiment of the lagoon entry system attached to the center wall as the robot cleaner enters the lagoon with the chamber held up by a boom on the truck trailer.
Figure 21:
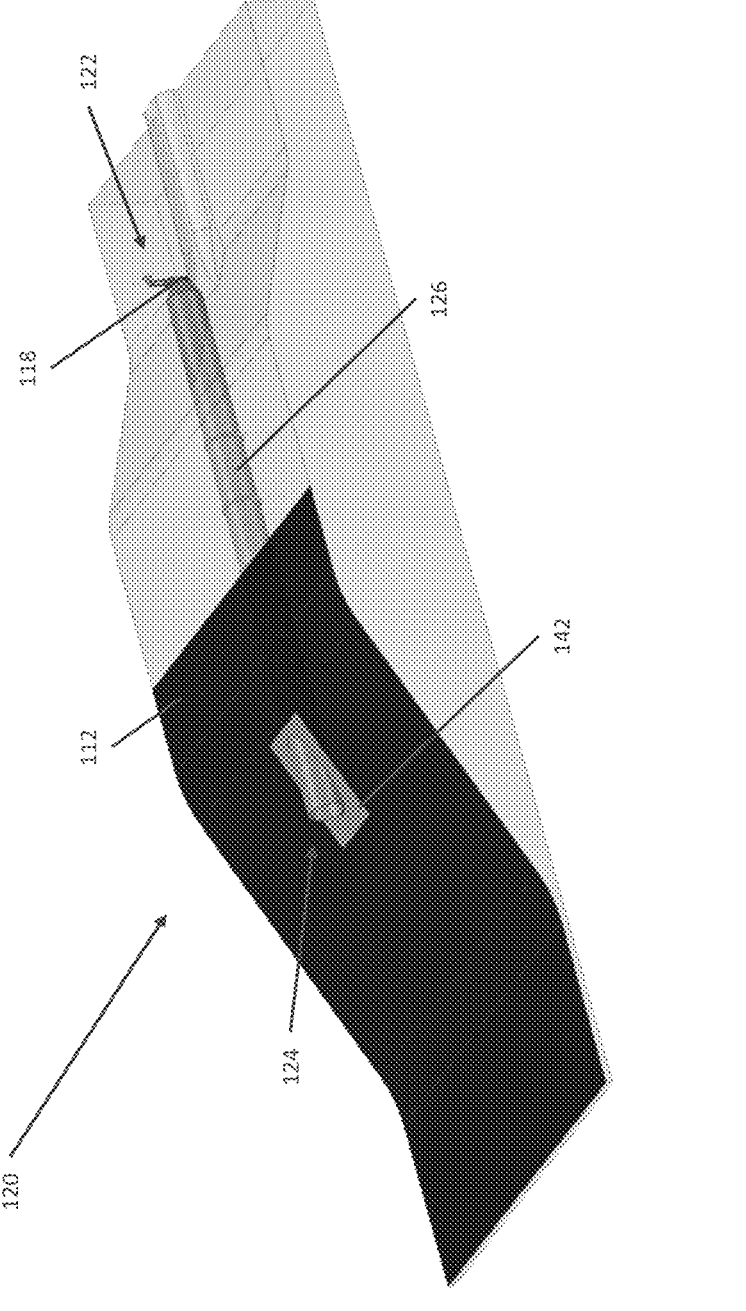
FIG. 21 shows a cutaway view of the conduit of yet another embodiment of the lagoon entry system through a berm surrounding the covered lagoon.
Figure 22:
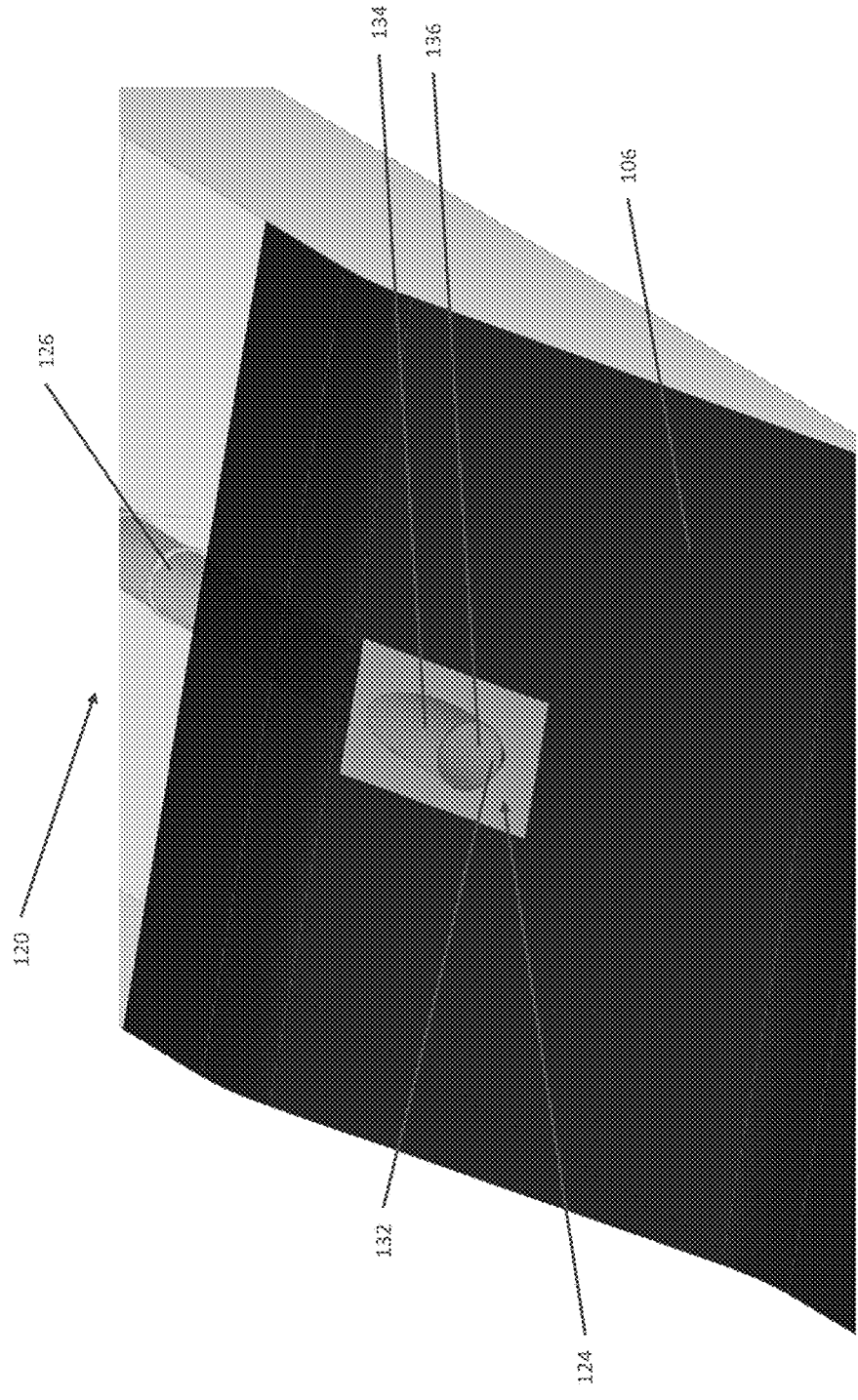
FIG. 22 shows another cutaway view of the embodiment of the lagoon entry system from the interior of the covered lagoon with the cover of the lagoon removed for convenience.
Figure 23:
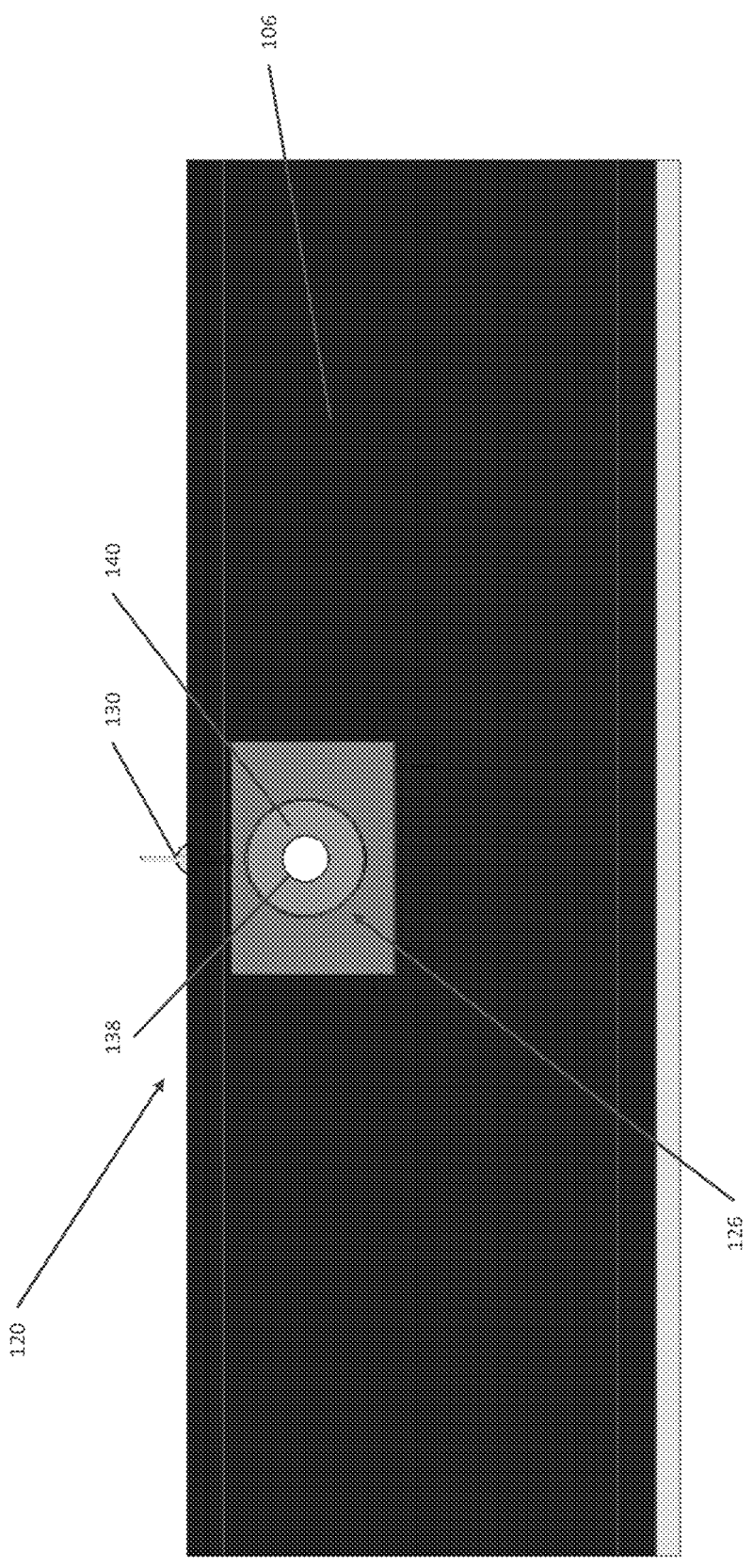
FIG. 23 shows an interior elevation view of the embodiment of the lagoon entry system from the interior of the covered lagoon with the cover of the lagoon removed for convenience.
Figure 24:
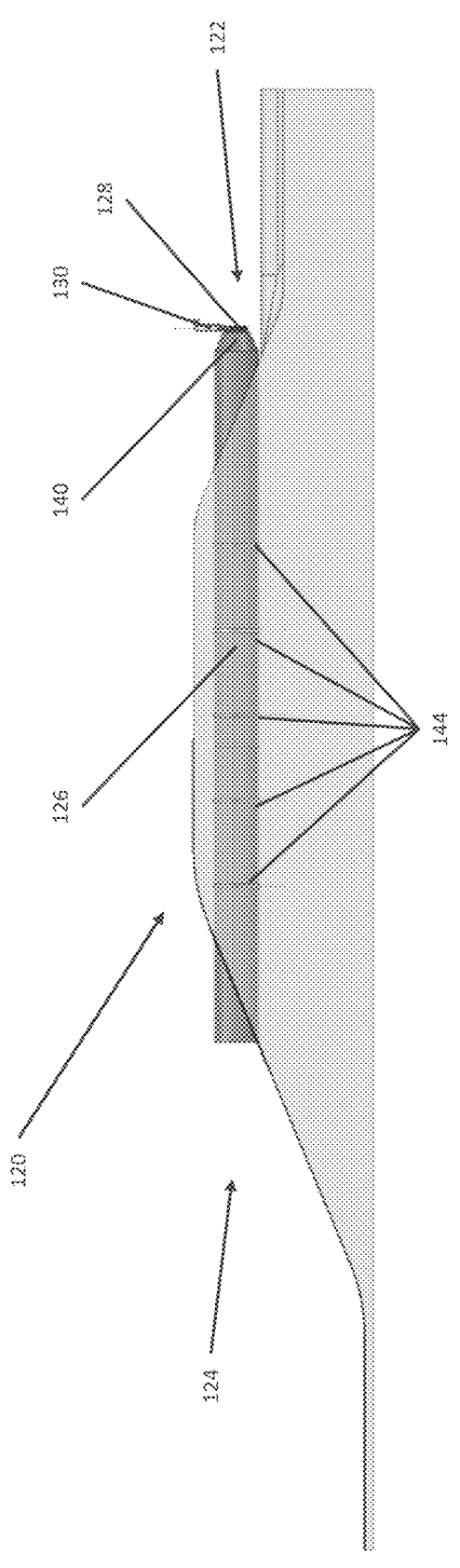
FIG. 24 shows a side elevation view of the embodiment of the lagoon entry system.
Figure 25:
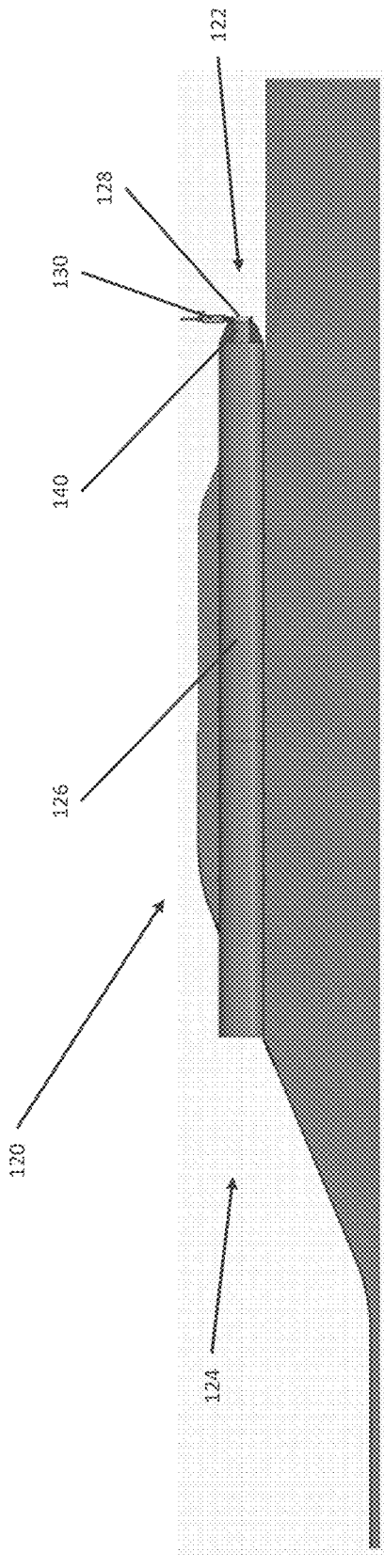
FIG. 25 shows a side elevation view of the embodiment of the lagoon entry system showing the exterior surface of the conduit.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of covered anaerobic lagoons. However, the embodiments are not so limited. It is appreciated that the embodiments may be adapted for use in other applications which may be improved by the disclosed structures, arrangements and/or methods. The system is merely shown and described as being used in the context of covered anaerobic lagoons for ease of description and as one of countless examples.

Covered Lagoon

The lagoon entry system presented herein is configured to be used with a covered lagoon 100 in the arrangement shown, as one example. A covered lagoon 100 is created by first excavating material from an area to create a lagoon, and more specifically, the floor of the lagoon. These lagoons are typically between 8 and 15 feet deep, although it should be known that the floor of the lagoon may be any depth. The floor of the lagoon often has sloped surfaces near the sides and ends of the lagoon and a generally flat and planar surface at or near the middle of the lagoon. The floors of the lagoon are covered with a liner 106 to prevent any material or matter within the lagoon from seeping into the ground around the lagoon. Once the liner 106 is properly installed, organic matter can be placed in the lagoon to be broken down into other compounds, including gasses such as methane gas. To prevent the gasses from escaping, a cover 104 is placed over the lagoon. When installed properly, the cover 104 placed over the lagoon creates a tightly enclosed system, meaning no oxygen is able to enter the covered lagoon 100 and no gasses, created while the organic matter is being broken down, are able to escape the covered lagoon 100. The cover 104 for these covered lagoons 100 can be any flexible material which creates an air/gas tight seal over the lagoon, such as, by way of example and not limitation, high-density polyethylene (HDPE).

Lagoon Entry System

With reference to the figures, a lagoon entry system (or simply "system 10") is presented. System 10 is formed of any suitable size, shape, and design and is configured to facilitate entry into a covered lagoon 100 without allowing gasses to escape the covered lagoon 100. In the arrangement shown, as one example, system 10 includes a center wall 12, an interior portion 14, an exterior portion 16, and a gate complex 18, among other components as described herein. In the arrangement shown, as one example, system 10 allows for a submersible robot cleaner 20 to enter into the covered lagoon 100 in order to clean the floor of the covered lagoon 100. While system 10 has been described according to the arrangement shown, as one example, any combination or arrangement may be used and is hereby contemplated for use.

Center Wall

In the arrangement shown, as one example, system 10 includes center wall 12. Center wall 12 is formed of any suitable size, shape, and design and are configured to connect system 10 to the covered lagoon 100, connect the various components of system 10, and allow an access point into the covered lagoon 100. In the arrangement shown, as one example, center wall 12 is a concrete wall, which is connected to the covered lagoon 100, is accessible from outside the covered lagoon 100, and provides an access point for entry into the covered lagoon 100. In the arrangement shown, as one example, center wall 12 has a top side 24, a bottom side 26, an interior side 28, an exterior side 30, and opposing left and right sides 32 (or simply "left/right side 32"). In the arrangement shown, as one example, center wall 12 includes opening 34.

In the arrangement shown, as one example, center wall 12 is a precast concrete wall which is brought to the covered lagoon 100 and placed in its desired position. In an alternative arrangement, as one example, center wall 12 may be poured on-site by placing a mold or form in the desired position and pouring concrete into the mold or form and allowing the concrete to solidify before removing for mold or form. In other alternative arrangements, as examples, center wall 12 may be formed of other materials such as, by way of example and not limitation, metallic materials, plastic materials, wooden materials, other masonry materials, or any composite or combination thereof.

In the arrangement shown, as one example, center wall 12 is operably connected to the cover 104 of the covered lagoon 100, thereby ensuring that the covered lagoon 100 stays sealed and no gasses are allowed to escape the covered lagoon 100. Center wall 12 may be connected to the cover 104 of covered lagoon 100 by any method. As one example, center wall 12 may be connected to the cover 104 of covered lagoon 100 by cutting off a portion of center wall 12, extending the cover 104 of the covered lagoon 100 over a portion of the top of center wall 12, and then re-connecting the removed portion of center wall 12 to the rest of center wall 12, using fasteners, adhesives, or any other connection method, thereby connecting the cover 104 of the covered lagoon 100 to center wall 12 and sealing the covered lagoon 100 so no gasses can escape. In an alternative arrangement, as another example, center wall 12 may be formed in two slabs, with one slab being placed, the cover 104 of the covered lagoon 100 extended over the first slab, then connecting the second slab to the first slab, thereby connecting the cover 104 of the covered lagoon 100 to center wall 12 and sealing the covered lagoon 100. As yet another alternative arrangement, as another example, if center wall 12 is poured at the site, as opposed to being pre-cast, a portion of center wall 12 may be poured and allowed to harden, then the cover 104 of the covered lagoon 100 is extended over the portion of center wall 12 which is formed, then the remaining portion of center wall 12 is poured and allowed to harden over the cover 104 of the covered lagoon 100, thereby connecting the covered lagoon 100 to center wall 12 and sealing the covered lagoon 100.

In the arrangement shown, as one example, center wall 12 is generally rectangular or square in shape. In the arrangement shown, as one example, when viewed from either top side 24 or bottom side 26, center wall 12 is generally rectangular with interior side 28 extending in approximate parallel planar spaced relation to exterior side 30, opposing left and rights sides 32 extending in approximate parallel planar spaced relation to one another, and each of the opposing left and right sides 32 extending in approximate perpendicular planar relation to both the interior side 28 and exterior side 30. In the arrangement shown, as one example, when viewed from either interior side 28 or exterior side 30, center wall 12 is generally rectangular or square in shape, with opposing left and right sides 32 extending in approximate parallel planar spaced relation to one another, and top side 24 and bottom side 26 extending in approximate parallel planar spaced relation to one another and in approximate perpendicular planar relation to each of the opposing left and right sides 32. In the arrangement shown, as one example, when viewed from either of the opposing left and right sides 32, center wall 12 is generally rectangular in shape, with top side 24 extending in approximate parallel planar spaced relation to bottom side 26, interior side 28 extending in approximate parallel planar spaced relation to exterior side 30, and both interior side 28 and exterior side 30 extending in approximate perpendicular planar relation to both of top side 24 and bottom side 26.

In the arrangement shown, as one example, center wall 12 is at least ten feet (10') in height. In the arrangement shown, as one example, the top side 24 of center wall 12 is generally co-linear with the ground around system 10. That is, the top side 24 of center wall 12 is generally flat and flush with the ground. In an alternative arrangement, as one example, the top side 24 of center wall 12 may be below the ground around system 10. In the above-mentioned arrangements of center wall, as one example, the opening 34 of center wall 12 is located below the liquid surface level within the covered lagoon 100. In yet another alternative arrangement, as one example, the top side 24 of center wall 12 may be above the ground around system 10. In this alternative arrangement, as one example, the opening 34 of center wall 12 is preferably located below the liquid surface level within the covered lagoon 100, however the opening 34 may be located at or above the liquid surface level within the covered lagoon 100.

In the arrangement shown, as one example center wall 12 includes opening 34. Opening 34 is formed of any suitable size, shape, and design and is configured to provide access into the covered lagoon 100 through center wall 12. Opening 34 extends through center wall 12 from interior side 28 to exterior side 30 and, as one example, allows submersible robot cleaner 20 to enter the covered lagoon 100 by entering opening 34 on the exterior side 30 of center wall 12 and passing through opening 34 and exiting opening 34 on the interior side 28 of center wall 12 into the covered lagoon 100.

In the arrangement shown, as one example, opening 34 is a generally circular opening which extends through center wall 12. However, opening 34 is not so limited and in an alternative arrangement, shown as another example, opening 34 is generally square or rectangular in shape. Additionally, by way of example and not limitation, opening 34 may be formed of any other shape or size including a triangle, a hexagon, octagon, or any other shape and size.

In the arrangement shown, as one example, opening 34 is 24 inches (24") in diameter, however any other sized opening 34 may be utilized in order to allow submersible robot cleaner 20 to enter into the covered lagoon 100 through opening 34, including an opening 34 which is 36 inches (36") in diameter, 48 inches (48") in diameter, or any other diameter or size. In the arrangement shown, as one example, opening 34 is located below the liquid surface level in the covered lagoon 100. In the arrangement shown, as one example, the liquid surface level in the covered lagoon 100 is located at least two feet (2') below ground level and the top of chamber 110 which contains submersible robot cleaner 20 is located approximately four feet (4') below ground level. In the arrangement shown, as one example, the top of opening 34 is located approximately two inches (2") below the top of the chamber 110 which contains submersible robot cleaner 20, therefore the top of opening 34 is located approximately four feet two inches (4' 2") below ground level. In alternative arrangements, as additional examples, the top of opening 34 may be located lower than two inches below the top of chamber 110 and/or lower than four feet two inches below ground level. Additionally, in the alternative arrangement shown, as one example, opening 34 may be located at or above the liquid surface level which is at least two feet below ground level. While opening 34 has been described according to the arrangements shown, as examples, opening 34 is not so limited. Opening 34 may be any other size, shape, and in any other position as may be desired in order to allow submersible robot cleaner 20 to enter into the covered lagoon 100 through opening 34 of center wall 12.

In the arrangement shown, as one example, the submersible robot cleaner 20 has a resting position in the exterior portion 16 of system 10 adjacent the exterior side 30 of center wall 12. The submersible robot cleaner 20 is configured to enter into the covered lagoon 100 through the gate complex 18, and specifically opening 34 of center wall 12. Once the submersible robot cleaner 20 is through opening 34 and gate complex 18, it enters the interior portion 14 of system 10 and the liquid of the covered lagoon 100.

In an alternative arrangement, as one example, center wall 12 may be formed as a part of interior portion 14. In another alternative arrangement, as one example, center wall 12 may be formed as a part of exterior portion 16. In these alternative arrangements, as one example, center wall 12 is the same as described above, however instead of being its own element, it is a part of either interior portion 14 or exterior portion 16 and may be formed singularly with the remaining parts of either interior portion 14 or exterior portion 16, or it may be assembled to other parts of interior portion 14 or exterior portion 16.

While center wall 12 has been described according the arrangements shown, as examples, it will be understood by those skilled in the art that any other configuration of center wall 12 may be used in order to connect system 10 to the covered lagoon 100, connect the various components of system 10, and allow an access point into the covered lagoon 100.

Interior Portion

In the arrangement shown, as one example, system 10 includes interior portion 14. Interior portion 14 is formed of any suitable size, shape, and design and is configured to connect to center wall 12 and provide a surface for submersible robot cleaner 20 to enter and exit covered lagoon 100 through system 10. In the arrangement shown, as one example, interior portion 14 is a concrete structure, which is located inside the covered lagoon 100 and adjacent interior side 28 of center wall 12. In the arrangement shown, as one example, interior portion 14 has opposing ends 36, opposing sides 37, a bottom surface 38 and side walls 40.

In the arrangement shown, as one example, interior portion 14 may be formed of multiple concrete slabs which are joined together to form interior portion 14, or interior portion 14 may be formed as a singular, unitary concrete structure. In the arrangement shown, as one example, interior portion 14 is a precast concrete structure which is brought to the covered lagoon 100 and placed in its desired position. In any situation where the covered lagoon 100 is already filled with liquid and system 10 is being retrofit to the covered lagoon 100, it is preferable to have a precast concrete interior portion 14 because the interior portion 14 can be placed while liquid is still in the covered lagoon 100. In an alternative arrangement, as one example, interior portion 14 may be poured on-site by placing a mold or form in the desired position and pouring concrete into the mold or form and allowing the concrete to solidify before removing the mold or form. If the covered lagoon 100 is not already filled with liquid, molds or forms can easily be placed in the desired position, the concrete can be poured, and interior portion 14 can set, however it is still the preferred option to have interior portion 14 be precast in these situations as well. In other alternative arrangements, as examples, interior portion 14 may be formed of other materials such as, by way of example and not limitation, metallic materials, plastic materials, wooden materials, other masonry materials, or any composite or combination thereof.

In the arrangement shown, as one example, interior portion 14 is located inside the covered lagoon 100 and adjacent interior side 28 of center wall 12. In the arrangement shown, as one example, the bottom surface 38 of interior portion 14 rests on top of the covered lagoon 100. In the arrangement shown, as one example, interior portion 14 is placed in the covered lagoon 100 and the liner 106 of the covered lagoon 100 is sealed to interior portion 14 of the covered lagoon 100. The liner 106 of the covered lagoon 100 can be sealed to interior portion 14 by cutting a portion of the liner 106 of the covered lagoon 100, placing interior portion 14, then sealing the liner 106 to the interior portion 14, thereby ensuring no liquid from the covered lagoon 100 will leak into the ground after system 10 is installed.

In the arrangement shown, as one example, interior portion 14 is a generally elongated structure. In the arrangement shown, as one example, interior portion 14 includes bottom surface 38 which is generally flat and planar in shape and extends from one opposing end 36 to the other opposing end 36, and from one opposing side 37 to the other opposing side 37. In the arrangement shown, as one example, bottom surface 38 includes a slight angled portion 42 at the opposing end 36 located away from interior side 28 of center wall 12. The sides of the covered lagoon 100 are generally sloped but the excavation prior to placing interior portion 14 creates a flat portion on which interior portion 14 is set. In order to provide submersible robot cleaner 20 with a transition from the generally flat nature of bottom surface 38 to the sloped sides of the covered lagoon 100, bottom surface 38 includes sloped portion 42. Angled portion 42 can be any placed at any angle that is less than or equal to the angle of the sloped sides of the covered lagoon 100.

In the arrangement shown, as one example, bottom surface 38 connects to a side wall 40 at each opposing side 37 of interior portion 14. Side walls 40 are formed of any suitable size, shape, and design and are configured to assist in aligning submersible robot cleaner 20 as it enters and exits the covered lagoon 100. In the arrangement shown, as one example, side walls 40 have a top surface 44, a lower edge 46, a first end 48, a second end 50, an interior surface 52, an exterior surface 54, a flat section 56, and an angled portion 58. In the arrangement shown, as one example, side walls 40 connect directly to bottom surface 38 at their lower edge 46. In the arrangement shown, as one example, lower edge 46 of side walls 40 is a generally flat and planar edge which extends at approximately a 90 degree angle and runs from the first end 48 to the second end 50 of side walls 40.

In the arrangement shown, as one example, side walls 40 connect to center wall 12 at their first end 48. In the arrangement shown, as one example, side walls 40, and interior portion 14, are connected to center wall 12 by bolts or other types of fasteners. However, any other methods of connecting concrete slabs may be used to connect side walls 40, and interior portion 14, to center wall 12, and in an alternative arrangement, as one example, center wall 12 may be formed as a part of interior portion 14.

In the arrangement shown, as one example, side walls 40 include a flat section 56 located at or near the first end 48. That is, in the arrangement shown as one example, flat section 56 of each side wall 40 is adjacent center wall 12. Flat section 56 has a flat and planar top surface 44 which is approximately parallel to and coplanar with top side 24 of center wall 12. At a point between first end 48 and second end 50, flat section 56 ends and angled portion 58 begins. In the arrangement shown, as one example, angled portion 58 has an angled top surface 44 which is angled such that it is approximately parallel to with the sloped sides of the covered lagoon 100. In this way, top surface 44 of angled portion 58 of side walls 40, in the arrangement shown as one example, forms a surface that is generally coplanar with of the sloped sides of the covered lagoon 100. In the arrangement shown, as one example, angled portion 58 of side walls 40 meets angled portion 42 of bottom surface 38 near the second end 50 of angled portion 58. In the arrangement shown, as one example, angled portion 58 of side walls 40 and angled portion 42 of bottom surface 38 are generally the same angle and, when they meet, form a singular angled plane which is also generally coplanar with the sloped sides of the covered lagoon 100.

In the arrangement shown, as one example, side walls 40 include an interior surface 52 and an exterior surface 54 (not shown). Interior surface 52 and exterior surface 54 are generally flat and planar surfaces which extend from the top surface 44 to the lower edge 46 of side walls 40 and extend from the first end 48 to the second end 50 of side walls 40. In the arrangement shown, as one example, exterior surface 54 (not shown) of side walls 40 is located on the outside of the side walls 40. In the arrangement shown, as one example, when interior portion 14 is inserted into a covered lagoon 100, the exterior surface 54 of side walls 40 is directly adjacent dirt, sand, or other material located under the liner 106 of the covered lagoon 100, such that the top surface 44 of the angled portion 58 of each side wall 40 is generally coplanar with the sloped sides of the covered lagoon 100.

In the arrangement shown, as one example, when submersible robot cleaner 20 enters the covered lagoon 100 through the opening 34 in center wall 12 and gate complex 18, it moves along the bottom surface 38 of interior portion 14 until it reaches the end of angled portion 42 of bottom surface 38, at which point the submersible robot cleaner 20 moves along the sides and floor of the covered lagoon 100. Alternative arrangements, shown as another example, do not include an interior portion 14. In these alternative arrangements, as one example, submersible robot cleaner 20 simply enters the covered lagoon 100 through the opening 34 of center wall 12 and gate complex 18 and immediately moves along the sides and floor of the covered lagoon 100. In yet other arrangements, as examples, interior portion 14 may not include a bottom surface 38, or they may not include side walls 40. While interior portion 14 has been described according the arrangement shown, as one example, it will be understood by those skilled in the art that any other configuration of interior portion 14 may be used in order to connect to center wall 12 and provide a surface to help submersible robot cleaner 20 enter and exit and covered lagoon 100 through system 10.

Exterior Portion

In the arrangement shown, as one example, system 10 includes exterior portion 16. Exterior portion 16 is formed of any suitable size, shape, and design and is configured to connect to center wall 12 and provide at least a partial enclosure for chamber 110 of submersible robot cleaner 20. In the arrangement shown, as one example, exterior portion 16 is a concrete structure which is located outside the covered lagoon 100 and adjacent exterior side 30 of center wall 12. In the arrangement shown, as one example, exterior portion 16 has opposing ends 60, opposing sides 62, a top surface 63, a bottom surface 64, an end wall 66, and side walls 68.

In the arrangement shown, as one example, exterior portion 16 may be formed of multiple concrete slabs which are joined together to form exterior portion 16, or exterior portion 16 may be formed as a singular, unitary concrete structure. In the arrangement shown, as one example, exterior portion 16 is a precast concrete structure which is brought to the covered lagoon 100 and placed in its desired position. In an alternative arrangement, as one example, exterior portion 16 may be poured on-site by placing a mold or form in the desired position and pouring concrete into the mold or form and allowing the concrete to solidify before removing the mold or form. In other alternative arrangements, as examples, exterior portion 16 may be formed of other materials such as, by way of example and not limitation, metallic materials, plastic materials, wooden materials, other masonry materials, or any composite or combination thereof.

In the arrangement shown, as one example, exterior portion 16 is located outside the covered lagoon 100 and adjacent exterior side 30 of center wall 12. In the arrangement shown, as one example, bottom surface 64 of exterior portion 16 rests on the ground, preferably below ground level following excavation of material away from the area upon which exterior portion 16 rests. More specifically, and without limitation, it is desirable for a six inch (6") base layer of rocks and/or other similar material (not pictured) be provided after material is excavated away from the area, and the bottom surface 64 of exterior portion 16 will rest upon this base layer.

In the arrangement shown, as one example, exterior portion 16 is configured to house chamber 110 and/or submersible robot cleaner 20. In the arrangement shown, as one example, chamber 110 of submersible robot cleaner 20 is approximately six feet (6') tall, In the arrangement shown, as one example, it is desired that the top of chamber 110 be at least 2 feet (2') below the maximum liquid surface level in the covered lagoon 100. This means that, in the desired arrangement as one example, the top of chamber 110 should be at least 4 feet below ground level. Given that chamber 110 is six feet tall and the desired location of the top of chamber 110 is four feet below ground level, it is desired that the height of exterior portion 16 from top surface 63 to bottom surface 64 be at least ten feet. While exterior portion 16 is described herein according to the desired height and depth of exterior portion 16, exterior portion 16 is not so limited. Exterior portion 16 may be any other height and it is contemplated that the height of exterior portion 16 is dependent on the specifications of the particular covered lagoon 100 within which system 10 is being installed and the set-up requested by the owner of the covered lagoon 100.

In the arrangement shown, as one example, top surface 63 of exterior portion 16 is formed by the top portions of each of the side walls 68 and end wall 66 of exterior portion 16. In the arrangement shown, as one example, top surface 63 is a generally flat surface which extends in a partial rectangle around the perimeter of exterior portion 16. In an alternative arrangement, as one example, it may be desired that exterior portion 16 has a removable cover over it. In this arrangement, as one example, top surface 63 would be the top surface of the cover and top surface 63 would be generally in the shape of a rectangle and would be sized to cover the entire open middle area of exterior portion 16.

In the arrangement shown, as one example, exterior portion 16 includes bottom surface 64, which is generally flat and planar, and extends from one opposing end 60 to the other opposing end 60 and from one opposing side 62 to the other opposing side 62. In the arrangement shown, as one example, exterior portion 16 includes an end wall 66 at the opposing end 60 of exterior portion 16 which is located away from center wall 12. In the arrangement shown, as one example, end wall 66 is a generally rectangular and planar wall which extends a height from the bottom surface 64 to the top surface 63 and a width from one opposing side 62 to the other opposing side 62.

In the arrangement shown, as one example, exterior portion 16 includes side walls 68 on each opposing side 62. In the arrangement shown, as one example, side walls 68 are generally rectangular and planar walls which extend a height from bottom surface 64 to top surface 63 and a width from one opposing end 60 to the other opposing end 60. In the arrangement shown, as one example, side walls 68, and exterior portion 16, connect to center wall 12 by bolts or other types of fasteners. However, any other method of connecting concrete slabs may be used to connect side walls 68, and exterior portion 16, to center wall 12, and in an alternative arrangement, as one example, center wall 12 may be formed as a part of exterior portion 16.

In an alternative arrangement, shown as one example, side walls 68 may be angled such that the height of side walls 68 are taller near center wall 12 than they are at the end furthest from center wall 12. In another alternative arrangement, as one example, side walls 68 may be sloped such that the height of side walls 68 are shorter near center wall 12 than they are at the end furthest from center wall 12. In yet another alternative arrangement, the bottom surface 64 of exterior portion 16 may be placed at an angle such that bottom surface 64 near center wall 12 is lower than bottom surface 64 which is located away from center wall 12. In this alternative arrangement, as one example, side walls 68 may be angled such that they are in approximate parallel planar spaced relation to bottom surface 64, or side walls 68 may be generally flat and planar surfaces. It will be understood by those skilled in the art that any other configuration of side walls 68 may be utilized.

While exterior portion 16 has been described according the arrangement shown, as one example, it will be understood by those skilled in the art that any other configuration of exterior portion 16 may be used in order to connect to center wall 12 and provide at least a partial enclosure for chamber 110 of submersible robot cleaner 20.

Gate Complex

In the arrangement shown, as one example, system 10 includes gate complex 18. Gate complex 18 is formed of any suitable size, shape, and design and is configured to provide selective access into the covered lagoon 100. In the arrangement shown, as one example, gate complex 18 has an outer side 72, an inner side 74, a conduit 76, a gate 78, and gate controller 80.

In the arrangement shown, as one example, gate complex 18 includes conduit 76. Conduit 76 is formed of any suitable size, shape, and design and is configured to extend through opening 34 of center wall 12 and connect to gate 78. In the arrangement shown, as one example, conduit 76 includes an interior surface 82, an exterior surface 84, a hollow interior 86, an interior plate 88, and an exterior plate 90.

In the arrangement shown, as one example, conduit 76 is formed of a metallic material such as steel, however any other metallic material may be used including, but not limited to, aluminum, chromium, or any other metallic material, alloy, and/or composite thereof. Alternatively, conduit 76 may be formed of a non-metallic material such as a plastic material, a fiberglass material, or any other non-metallic material and/or composite thereof. In the arrangement shown, as one example, conduit 76 may be formed of multiple pieces that are connected or assembled to one another through bolting, welding, screwing, or any other means of connecting or assembling the multiple pieces of conduit 76. Alternatively, conduit 76 may be formed of a single, unitary member that is formed in a process such as casting, rolling, machining, additive manufacturing, or the like to form a unitary member.

In the arrangement shown, as one example, conduit 76 is a generally cylindrical conduit, with an interior surface 82, an exterior surface 84, and a hollow interior 86, and conduit 76 extends from the outer side 72 to the inner side 74 of gate complex 18. In the arrangement shown, as one example, conduit 76 includes an interior plate 88 which is positioned at or near inner side 74. Interior plate 88 is formed of any suitable size, shape, and design and is configured to engage with the interior side 28 of center wall 12 in order to secure conduit 76. In the arrangement shown, as one example, interior plate 88 is generally square or rectangular in shape and is a generally flat member. In the arrangement shown, as one example, interior plate 88 includes an open area which coincides with the hollow interior 86 of conduit 76. That is, the hollow interior 86 of conduit 76 extends through interior plate 88, and in this way, interior plate 88 does not prohibit an object from passing through conduit 76.

In the arrangement shown, as one example, conduit 76 also includes an exterior plate 90. Exterior plate 90 is formed of any suitable size, shape, and design and is configured to facilitate connection between conduit 76 and center wall 12 and to facilitate connection between conduit 76 and chamber 110 of submersible robot cleaner 20. In the arrangement shown, as one example, exterior plate 90 is a generally circular member which extends outward from conduit 76 at outer side 72 and includes an open area which coincides with the hollow interior 86 of conduit 76. In the arrangement shown, as one example, exterior plate 90 is a generally flat member through which bolts are extended to connect conduit 76 to center wall 12. While, in the arrangement shown as one example, exterior plate 90 is connected to center wall 12 through bolts, any other fastener or method of connection may be used to connect exterior plate 90 to center wall 12.

In the arrangement shown, as one example, gate complex 18 includes gate 78. Gate 78 is formed of any suitable size, shape, and design and is provide selective access into and out of the covered lagoon 100. In the arrangement shown, as one example, gate 78 is configured to prevent material, including the liquid inside the covered lagoon 100 and submersible robot cleaner 20, from passing through the hollow interior 86 of conduit 76 and opening 34 of center wall 12. In the arrangement shown, as one example, gate 78 may be formed of a metallic material, such as steel, aluminum, chromium, or any other metallic material, alloy, and/or composite thereof. Alternatively, gate 78 may be formed of a non-metallic material such as a plastic material, a fiberglass material, or any other non-metallic material and/or composite thereof.

In the arrangement shown, as example, gate 78 may be configured to move vertically upward and downward. In this arrangement, as one example, when gate 78 is down, gate 78 prevents material from passing through the hollow interior 86 of conduit 76 and opening 34 of center wall 12. In this arrangement, when gate 78 is raised vertically, material such as submersible robot cleaner 20 is allowed to pass through the hollow interior 86 of conduit 76, thereby providing selective access into the covered lagoon 100. In this arrangement, as one example, when gate 78 is raised vertically, there is the possibility that liquid from the covered lagoon 100 may also escape the covered lagoon 100. However, in the arrangement shown, as one example, chamber 110 of submersible robot cleaner 20 is connected to the exterior plate 90 of conduit 76 and collects water traveling from inside the covered lagoon 100 through the conduit 76 within the chamber 110 where it can be drained. While gate 78 has been described as providing selective access by vertically raising gate 78, gate 78 is not so limited. In alternative arrangements, gate 78 may provide selective access into the covered lagoon 100 by moving laterally, or gate 78 may provide selective access into the covered lagoon 100 by moving outward and upward from its resting position. As one of skill in the art will appreciate, gate 78 may be configured to move in different directions and still provide selective access into the covered lagoon 100, therefore any configuration and movement of gate 78 may be utilized to provide selective access into the covered lagoon 100.

In the arrangement shown, as one example, gate 78 is controlled by gate controller 80. Gate controller 80 is formed of any suitable size, shape, and design and is configured to control the opening and closing of gate 78. In the arrangement shown, as one example, gate controller 80 may be a single cylinder hydraulic drive motor, an electric motor, a manual hydraulic controller, or any other mechanism or device capable of controlling the opening and closing of gate 78.

Submersible Robot Cleaner

In the arrangement shown, as one example, system 10 is designed to allow a submersible robot cleaner 20 access into a covered lagoon 100 in order for submersible robot cleaner 20 to clean the floor of covered lagoon 100. Submersible robot cleaner 20 is formed of any suitable size, shape, and design and is configured to clean materials off the floor of covered lagoon 100. In the arrangement shown, as one example, when not in use submersible robot cleaner 20 is stored within chamber 110. Chamber 110 is formed of any suitable size, shape, and design and is configured to house submersible robot cleaner 20, connect to gate complex 18, and facilitate the capture and draining of any liquid which may escape from covered lagoon 100 when gate 78 is opened.

Method of Retrofitting the Lagoon Entry System to a Covered Lagoon

In one or more arrangements, system 10 is designed to be retrofit to existing covered lagoons 100 or installed onto covered lagoons 100 while the covered lagoon 100 is being initially constructed. When using system 10 to retrofit an existing covered lagoon 100, an opening is formed in cover 104, such as by cutting cover 104 at the desired position of system 10. Once an opening is formed in cover 104, material may then be excavated away from the desired position of system 10. Material may be excavated away from an interior area, which is located inside the covered lagoon, and from an exterior area, which is outside the covered lagoon and adjacent the interior area. In the preferred embodiment, as one example, material is removed from the exterior area to a depth of ten feet six inches (10' 6"), in order to allow the top of chamber 110 to be approximately four feet below ground level, and material will be excavated away from the interior area such that the surface level of the interior area and the exterior area are even. In the arrangement shown, as one example, once excavation is finished, the size and configuration of the exterior area will be such that the exterior portion 16 of system 10 may be placed into the exterior area. Similarly, once excavation is finished, the size and configuration of the interior area will be such that the interior portion 14 of system 10 may be placed into the interior area.

In the arrangement shown, as one example, once excavation of the interior area and the exterior area are completed, the center wall 12 is placed at the point where the covered lagoon 100 meets the ground. In other words, center wall 12 is placed such that the interior side 28 of center wall 12 is located inside the covered lagoon 100 and the exterior side 30 of center wall 12 is located outside the covered lagoon 100. In the arrangement shown, as one example, center wall 12 is separate from both the interior portion 14 and the exterior portion 16 and is therefore placed individually. In the arrangement shown, as one example, after center wall 12 is placed, the interior portion 14 is placed in the interior excavated area and connected to interior side 28 of center wall 12 and exterior portion 16 is placed in the exterior excavated area and connected to the exterior side 30 of center wall 12. In the arrangement shown, as one example, interior portion 14 and exterior portion 16 can be connected to center wall 12 in either order, that is interior portion 14 can be connected to center wall 12 either before or after exterior portion 16 is connected to center wall 12, and vice versa.

In an alternative arrangement, as one example, center wall 12 may be formed as a part of exterior portion 16 and exterior portion 16 may be placed such that exterior portion 16 is in the exterior excavated area and the interior side 28 of center wall 12 is positioned on the inside of covered lagoon 100 and exterior side 30 of center wall 12 is positioned outside of covered lagoon 100. In the alternative arrangement, once exterior portion 16, which has been formed with center wall 12, is positioned correctly, interior portion 14 is then placed in the interior excavated area and connected to the interior side 28 of center wall 12.

In yet another alternative arrangement, as one example, center wall 12 may be formed as a part of interior portion 14 and interior portion 14 may be placed such that interior portion 14 is in the interior excavated area and the interior side 28 of center wall 12 is positioned on the inside of covered lagoon 100 and exterior side 30 of center wall 12 is positioned outside of covered lagoon 100. In this alternative arrangement, once interior portion 14, which has been formed with center wall 12, is positioned correctly, exterior portion 16 can be positioned in the exterior excavated area and connected to the exterior side 30 of center wall 12.

In the arrangement shown, as one example, once center wall 12, interior portion 14, and exterior portion 16 are in their correct positions, the cover 104 and liner 106 of covered lagoon 100 can be sealed to system 10. In the arrangement shown, as one example, cover 104 can be sealed to system 10 by removing the top portion of center wall 12, extending cover 104 over the top portion of center wall 12, and the top portion of center wall 12 which was removed is then reconnected to the remainder of center wall 12. In an alternative arrangement, rather than removing a top portion of center wall 12, cover 104 can be extended over the top of center wall 12 and additional concrete can be poured onto the top of center wall 12 and formed with cover 104 between the existing center wall 12 and the new upper portion of center wall 12, which will seal cover 104 into center wall 12. Once cover 104 is properly positioned and sealed to center wall 12, no gasses will be able to escape covered lagoon 100.

In the arrangement shown, as one example, extra material can be provided to liner 106 and liner 106 can simply be placed over side walls 40 and bottom surface 38 of interior portion 14 and then tightened such that liner 106 rests tightly against top surface 44 of side walls 40, as well as interior surface 52 of side walls 40, and bottom surface 38 of interior portion 14. Alternatively, rather than having liner 106 with extra material, additional material can be connected to the existing liner 106 in order for liner 106 to extend tightly over interior portion 14. Once liner 106 is correctly positioned and sealed over interior portion 14, the liquid within covered lagoon 100 will not be able to leak into the ground.

In the arrangement shown, as one example, either before or after interior portion 14 and exterior portion 16 are connected to center wall 12, and either before or after center wall 12 is placed, gate complex 18 can be connected to center wall 12. In the arrangement shown, as one example, conduit 76 is configured to extend through the opening 34 of center wall 12. In the arrangement shown, as one example, conduit 76 may be formed into center wall 12 by being included in the mold or form used to pour the concrete for center wall 12. Alternatively, conduit 76 may be created of multiple pieces which are assembled to the already formed center wall 12 with opening 34. Conduit 76 may be assembled to the already formed center wall 12 by placing the main section of conduit 76 through the opening 34, then placing interior plate 88 of conduit 76 around the main section of conduit 76 and adjacent the interior side 28 of center wall 12 and connecting interior plate 88 to conduit 76 through a process such as welding. Additionally, exterior plate 90 of conduit 76 may be placed around the main section of conduit 76 and adjacent the exterior side 30 of center wall 12 and connecting exterior plate 90 to conduit 76 through a process such as welding.

In the arrangement shown, as one example, with conduit 76 extending through opening 34 of center wall 12, gate 78 may then be connected to conduit 76 such that it can selectively allow access to covered lagoon 100. Gate controller 80 can then be connected to gate 78 such that gate controller 80 can selectively control the opening and closing of gate 78. In this way, gate complex 18 is assembled and operably connected to center wall 12.

In the arrangement shown, as one example, once center wall 12 is connected to each of the interior portion 14, exterior portion 16, and gate complex 18, submersible robot cleaner 20 can be connected to gate complex 18. Submersible robot cleaner 20 may be positioned within chamber 110 and chamber 110 can be connected to exterior plate 90 of gate complex 18 through the use of fasteners such as bolts. In the arrangement shown, as one example, with chamber 110 connected to exterior plate 90, cover 104 properly sealed to center wall 12, and liner 106 properly sealed to interior portion 14, covered lagoon 100 is once again covered and able to hold liquid and gasses therein. Additionally, gate 78 is positioned to allow for selective entry into covered lagoon 100 in a manner which allows no liquid or gasses to escape the enclosed system, with the exception of any liquid which flows into chamber 110 when gate 78 is opened, which is then properly drained out of chamber 110 and exposed of.

In Operation

In the arrangement shown, as one example, system 10 is configured to allow a submersible robot cleaner 20 to enter into and clean the floor of covered lagoon 100. In the arrangement shown, as one example, submersible robot cleaner 20 is configured to enter the covered lagoon 100 through conduit 76 of gate complex 18. In the arrangement shown, as one example, conduit 76 extends through opening 34 in center wall 12 and includes exterior plate 90 on the outer side 72 of gate complex 18. In the arrangement shown, as one example, chamber 110 is connected to exterior plate 90 of gate complex 18, in a fluid tight manner, with submersible robot cleaner 20 housed within chamber 110. Once chamber 110 is connected to exterior plate 90, gate 78 may be opened and submersible robot cleaner 20 may pass through conduit 76 and enter into the covered lagoon 100. While submersible robot cleaner 20 is in covered lagoon 100, gate 78 may be left fully open, partially open, or it may be fully closed. If gate 78 is wholly or partially open, liquid from covered lagoon 100 may travel into chamber 110, however it will not leak into the ground if properly connected and, in the preferred arrangement, the atmospheric pressure within chamber 110 will be greater than the pressure in the covered lagoon 100, therefore the liquid will not pass into chamber 110. Once submersible robot cleaner 20 is finished cleaning covered lagoon 100, it can return to the interior portion 14 of system 10, travel over bottom surface 38 of interior portion 14, and pass back through conduit 76 and into chamber 110. Once submersible robot cleaner 20 is back in chamber 110, gate 78 can be closed and any liquid from covered lagoon 100 which entered into chamber 110 may be drained from chamber 110 and properly disposed of.

Alternative Arrangement

With reference to the figures, a lagoon entry system (or simply "system 120") is presented. System 120 is formed of any suitable size, shape, and design and is configured to facilitate entry into a covered lagoon 100 without allowing gasses to escape the covered lagoon 100. In the arrangement shown, as one example, system 120 includes a conduit 126 with a hollow interior 136, an interior surface 132, an exterior surface 134, an opening 138, a throat 140, and a gate complex 118 with an outer side 122, an inner side 124, a gate 128, and a gate controller 130 among other components as described herein. In the arrangement shown, as one example, system 120 allows for a submersible robot cleaner 20 to enter into the covered lagoon 100 through a berm 112 surrounding the covered lagoon in order to clean the floor of the covered lagoon 100 with minimal excavating and disturbing the interior of the covered lagoon 100. While system 120 has been described according to the arrangement shown, as one example, any combination or arrangement may be used and is hereby contemplated for use.

Conduit

In the arrangement shown, as one example, system 120 includes conduit 126. Conduit 126 is formed of any suitable size, shape, and design and is configured to connect system 120 to the covered lagoon 100, connect the various components of system 120, and allow an access point into the inside of covered lagoon 100. In the arrangement shown, as one example, conduit 126 is an elongated pipe, which is connected to and in communication with the interior of covered lagoon 100, is accessible from outside the covered lagoon 100, and provides an access point for entry into the covered lagoon 100. In the arrangement shown, as one example, conduit 126 has an interior surface 132, exterior surface 134, hollow interior 136, opening 138, and a throat 140.

In the arrangement shown, as one example, conduit 126 is an extruded high-density polyethylene (HDPE) thermoplastic pipe which is brought to the covered lagoon 100 and placed in its desired position. In an alternative arrangement, as one example, conduit 126 may be fabricated in pieces and assembled on-site by coupling pieces of the HDPE pipe by heat fusion, welding, gluing, heat staking, or otherwise fusing the HDPE pipe pieces together to form the complete conduit 126. In other alternative arrangements, as examples, conduit 126 may be formed of other materials such as, by way of example and not limitation, metallic materials, plastic materials, wooden materials, or any composite or combination thereof.

In the arrangement shown, as one example, conduit 126 is inserted through the surrounding berm 112 of the covered lagoon 100, thereby ensuring that the covered lagoon 100 stays sealed and no gasses are allowed to escape the covered lagoon 100 during use. Conduit 126 may be inserted into the berm 112 of covered lagoon 100 by any method. As one example, an amount of the berm 112 may be excavated away from the area creating a trench where the conduit 126 is to be placed, after which the trench is back filled sealing the covered lagoon for later use.

In the arrangement shown, as one example, conduit 126 is generally cylindrical in shape. In the arrangement shown, as one example, the portion of the conduit 126 that is surrounded by the berm 112 has a constant diameter of 63 inches. In the arrangement shown, as one example, the portion of the conduit 126 that extends out of the external portion of the berm 112 includes a throat 140 that reduces the diameter of the conduit from 63 inches to an opening 138 of 36 inches (36") in diameter for connection to the chamber 110 that inserts the submersible robot cleaner 20. In the arrangement shown, as one example, the top of the conduit 126 reaching into the interior portion of the covered lagoon 100 is about 5 feet-6 inches below the top of berm 112. In other arrangements, the size, shape, location, and design of the conduit 126 may take any configuration that allows for ingress and egress of the submersible robot cleaner 20 from the exterior into and out of the interior of the covered lagoon 100.

In the arrangement shown, as one example conduit 126 includes opening 138. Opening 138 is formed of any suitable size, shape, and design and is configured to provide access into the covered lagoon 100 through conduit 126. In the arrangement shown, as one example, opening 138 connects to throat 140 which leads to the main portion of the conduit 126 that extends through the berm 112 and into the covered lagoon 100.

In the arrangement shown, as one example, opening 138 is a generally circular opening. However, opening 138 is not so limited and in an alternative arrangement, shown as another example, opening 138 is generally square or rectangular in shape. Additionally, by way of example and not limitation, opening 138 may be formed of any other shape or size including a triangle, a hexagon, octagon, or any other shape and size.

In the arrangement shown, as one example, opening 138 is 36 inches (36") in diameter, however any other sized opening 138 may be utilized in order to allow submersible robot cleaner 20 to enter into the covered lagoon 100 through opening 138, including an opening 138 which is 24 inches (24") in diameter, 48 inches (48") in diameter, or any other diameter or size. In the arrangement shown, as one example, opening 138 is located below the liquid surface level in the covered lagoon 100. In the arrangement shown, as one example, the liquid surface level in the covered lagoon 100 is located at least two feet (2') below the top of berm 112. In the arrangement shown, as one example, the bottom of the main portion of the conduit 126 which contains submersible robot cleaner 20 is located approximately 10 feet 9 inches (10'-9") below ground level, therefore the top of opening 138 is located approximately 9 feet 7.5 inches (9'-7.5") below the top of berm 112.

In alternative arrangements, as additional examples, opening 138 may be located at or above the liquid surface level which is at least two feet below top of berm 112. While opening 138 has been described according to the arrangements shown, as examples, opening 138 is not so limited. Opening 138 may be any other size, shape, and in any other position as may be desired in order to allow submersible robot cleaner 20 to enter into the covered lagoon 100 through opening 138 and conduit 126.

In the arrangement shown, as one example, the submersible robot cleaner 20 is configured to enter into the covered lagoon 100 through gate complex 118, and specifically opening 138 of conduit 126 of gate complex 118. Once the submersible robot cleaner 20 is through opening 138 and gate complex 118, it enters the interior and the liquid of the covered lagoon 100.

While conduit 126 has been described according the arrangements shown, as examples, it will be understood by those skilled in the art that any other configuration of conduit 126 may be used in order to connect system 120 to the covered lagoon 100, connect the various components of system 120, and allow an access point into the covered lagoon 100.

Gate Complex

In the arrangement shown, as one example, system 120 includes gate complex 118. Gate complex 118 is formed of any suitable size, shape, and design and is configured to provide selective access into the covered lagoon 100. In the arrangement shown, as one example, gate complex 118 has an outer side 122, an inner side 124, a conduit 126, a gate 128, and gate controller 130.

In the arrangement shown, as one example, gate complex 118 includes conduit 126. Conduit 126 is formed of any suitable size, shape, and design and is configured to connect to gate 128. In the arrangement shown, as one example, conduit 126 is a generally cylindrical conduit, with an interior surface 132, an exterior surface 134, and a hollow interior 136, and conduit 126 extends from the outer side 122 to the inner side 124 of gate complex 118.

In the arrangement shown, as one example, gate complex 118 includes gate 128. Gate 128 is formed of any suitable size, shape, and design and is provide selective access into and out of the covered lagoon 100. In the arrangement shown, as one example, gate 128 is configured to prevent material, including the liquid inside the covered lagoon 100 and submersible robot cleaner 20, from passing through the hollow interior 136 of conduit 126 and opening 138 of conduit 126. In the arrangement shown, as one example, gate 128 may be formed of a metallic material, such as steel, aluminum, chromium, or any other metallic material, alloy, and/or composite thereof. Alternatively, gate 128 may be formed of a non-metallic material such as a plastic material, a fiberglass material, or any other non-metallic material and/or composite thereof.

In the arrangement shown, as example, gate 128 may be configured to move vertically upward and downward. In this arrangement, as one example, when gate 128 is down, gate 128 prevents material from passing through the hollow interior 136 and opening 138 of conduit 126. In this arrangement, when gate 128 is raised vertically, material such as submersible robot cleaner 20 is allowed to pass through the hollow interior 136 of conduit 126, thereby providing selective access into the covered lagoon 100. In this arrangement, as one example, when gate 128 is raised vertically, there is the possibility that liquid from the covered lagoon 100 may also escape the covered lagoon 100. However, in the arrangement shown, as one example, chamber 110 of submersible robot cleaner 20 is connected to conduit 126, therefore water enters into the chamber 110 where it can be drained. While gate 128 has been described as providing selective access by vertically raising gate 128, gate 128 is not so limited. In alternative arrangements, gate 128 may provide selective access into the covered lagoon 100 by moving laterally, or gate 128 may provide selective access into the covered lagoon 100 by moving outward and upward from its resting position. As one of skill in the art will appreciate, gate 128 may be configured to move in different directions and still provide selective access into the covered lagoon 100, therefore any configuration and movement of gate 128 may be utilized to provide selective access into the covered lagoon 100.

In the arrangement shown, as one example, gate 128 is controlled by gate controller 130. Gate controller 130 is formed of any suitable size, shape, and design and is configured to control the opening and closing of gate 128. In the arrangement shown, as one example, gate controller 130 may be a single cylinder hydraulic drive motor, an electric motor, a manual hydraulic controller, or any other mechanism or device capable of controlling the opening and closing of gate 128.

Submersible Robot Cleaner

In the arrangement shown, as one example, system 120 is designed to allow a submersible robot cleaner 20 access into a covered lagoon 100 for submersible robot cleaner 20 to clean the floor of covered lagoon 100. Submersible robot cleaner 20 is formed of any suitable size, shape, and design and is configured to clean materials off the floor of covered lagoon 100. In the arrangement shown, as one example, when not in use submersible robot cleaner 20 is stored within chamber 110. Chamber 110 is formed of any suitable size, shape, and design and is configured to house submersible robot cleaner 20, connect to gate complex 118, and facilitate the capture and draining of any liquid which may escape from covered lagoon 100 when gate 128 is opened.

Method of Retrofitting the Lagoon Entry System to a Covered Lagoon

In one or more arrangements, system 120 is designed to be retrofit to existing covered lagoons 100 or installed onto covered lagoons 100 while the covered lagoon 100 is being initially constructed. When using system 120 to retrofit an existing covered lagoon 100, an opening is formed in cover 104 and liner 106, such as by cutting cover 104 and liner 106 at the desired position of system 120. Once an opening is formed in cover 104, material may then be excavated away from the berm 112 at the desired position of system 120. In the arrangement shown, as one example, material is removed from the exterior area to a depth of eleven feet three inches (11' 3"). In the arrangement shown, as one example, once excavation is finished, a six inch (6") class I or class II uncompacted material bedding is placed at the bottom of the trench for stability.

In the arrangement shown, as one example, once excavation of the interior area and the exterior area are completed, thruster rings 144 may be added to conduit 126 about the exterior surface 134. In the arrangement shown, as one example, the thruster rings 144 extend annularly from the external surface 134 about the conduit 126 and prevent the conduit 126 from shifting laterally toward or away from the interior of the covered lagoon 100. In the arrangement shown, as one example, once thruster rings 144 are optionally applied, the conduit 126 is placed in the trench and then excavated material may be used to recover the conduit 126 and build the berm 112 back up. In other arrangements, the thruster rings 144 are added to conduit 126 after conduit 126 is placed within the trench.

In the arrangement shown, as one example, a reinforcement piece 142 is coupled to the interior end of the conduit 126 to ensure a watertight fit between the conduit 126 and the liner 106. The reinforcement piece is any suitable size, shape, and design and is configured to provide a solid and watertight attachment to the conduit 126 and the liner 106. In the arrangement shown, as one example, the reinforcement piece 142 is a high-density polyethylene (HDPE) generally rectangular piece that rests on and is generally co-planar with the interior portion of the berm 112 and surrounds the conduit 126 at the entry into the interior of the covered lagoon 100. In the arrangement shown, as one example, the reinforcement piece 142 is coupled to the conduit 126 and the liner 106 in any way known in the art such as welding. In other arrangements, the reinforcement piece 142 may be formed of a metallic material, such as steel, aluminum, chromium, or any other metallic material, alloy or non-metallic material such as a plastic material, a fiberglass material, or any other non-metallic material and/or composite thereof, and is attached to the conduit 126 and the liner 106 using welding, fasteners, adhesives, or any other connection method suitable for a reliable and airtight system.

In the arrangement shown, as one example, with the berm 112 rebuilt about the conduit 126, the cover 104 and liner 106 opening are welded shut, resealing the covered lagoon 100 for use. Once cover 104 is properly positioned and sealed, no gasses will be able to escape covered lagoon 100.

Either before or after the berm 112 is rebuilt and/or cover 104 and liner 106 are resealed, gate complex 118 can be connected to opening 138. In the arrangement shown, as one example, gate 128 may be connected to conduit 126 such that it can selectively allow access to covered lagoon 100. Gate controller 130 can then be connected to gate 128 such that gate controller 130 can selectively control the opening and closing of gate 128. In this way, gate complex 118 is assembled and operably connected to conduit 126.

In the arrangement shown, as one example, submersible robot cleaner 20 is positioned within chamber 110 and chamber 110 can be connected to outer side 122 of gate complex 118 through the use of fasteners such as bolts. With chamber 110 connected to gate complex 118, cover 104 properly sealed, and liner 106 properly sealed over conduit 126, covered lagoon 100 is once again covered and able to hold liquid and gasses therein. Additionally, gate complex 118 is positioned to allow for selective entry into covered lagoon 100 in a manner which allows no liquid or gasses to escape the enclosed system, with the exception of any liquid which flows into chamber 110 when gate complex 118 is opened, which is then properly drained out of chamber 110 and disposed of.

In Operation

In the arrangement shown, as one example, system 120 is configured to allow a submersible robot cleaner 20 to enter into and clean the floor of covered lagoon 100. In the arrangement shown, as one example, submersible robot cleaner 20 is configured to enter the covered lagoon 100 through conduit 126 of gate complex 118. In the arrangement shown, as one example, conduit 126 extends through berm 112 and includes gate complex 118. In the arrangement shown, as one example, chamber 110 is connected to gate complex 118, in a fluid tight manner, with submersible robot cleaner 20 housed within chamber 110. Once chamber 110 is connected to gate complex 118, gate 128 may be opened and submersible robot cleaner 20 may pass through conduit 126 and enter into the covered lagoon 100. While submersible robot cleaner 20 is in covered lagoon 100, gate 128 may be left fully open, partially open, or it may be fully closed. If gate 128 is wholly or partially open, liquid from covered lagoon 100 may travel into chamber 110, however it will not leak into the ground if properly connected and, in the preferred arrangement, the atmospheric pressure within chamber 110 will be greater than the pressure in the covered lagoon 100, therefore the liquid will not pass into chamber 110. Once submersible robot cleaner 20 is finished cleaning covered lagoon 100, it can return to and travel through the hollow interior 136 of system 120 and into chamber 110.

Once submersible robot cleaner 20 is back in chamber 110, gate 128 can be closed and any liquid from covered lagoon 100 which entered into chamber 110 may be drained from chamber 110 and properly disposed of.

From the above discussion it will be appreciated that the system 120 presented herein improves upon the state of the art. Specifically, in one or more arrangements, system 120 is presented which: improves upon the state of the art; is safe to operate; is relatively easy to build; is relatively friendly to build; can be built relatively quickly and efficiently; is easy to operate; is relatively cost friendly to manufacture; is relatively easy to transport for installation; is aesthetically appealing; is robust; does not allow gasses to escape the covered lagoon; is relatively inexpensive; is not easily susceptible to wear and tear; has a long useful life; is efficient to use and operate.

What is claimed:

1. A method of retrofitting a lagoon entry system to a covered lagoon, the covered lagoon having a cover, a floor covered by a liner, and liquid contained therein having a surface level, and gas contained therein above the surface level of the liquid, the method comprising:
    excavating material from a perimeter of the covered lagoon;
    providing a center wall;
    providing a conduit extending through an opening in the center wall, wherein the conduit is in communication with an exterior of the covered lagoon and an interior of the covered lagoon;
    wherein the conduit includes an interior opening extending through the floor and liner of the covered lagoon;
    wherein the interior opening in the conduit is located below the surface level of the liquid contained within the covered lagoon;
    wherein the conduit includes an exterior opening selectively accessible from the exterior of the covered lagoon;
    providing selective access into the interior of the covered lagoon through a gate on the conduit covering the exterior opening;
    wherein the interior opening of the conduit is placed within the covered lagoon; and
    sealing the liner of the covered lagoon to the interior opening;
    sealing the cover of the covered lagoon to the center wall;
    wherein the gate is configured to receive a submersible robot cleaner configured to clean the floor of the covered lagoon.

2. The method of claim 1, further comprising the step of:
    excavating material from the interior of the covered lagoon.

3. The method of claim 1, wherein the gate is controlled by a gate controller.

4. The method of claim 1, wherein a hole is cut in the cover of the covered lagoon prior to excavating material from an interior area.

5. The method of claim 1, wherein material is excavated away from the exterior of the covered lagoon.

6. The method of claim 1, wherein the conduit is a pipe that extends through a berm that surrounds the covered lagoon.

7. The method of claim 1, wherein the conduit is a pipe that extends through a berm that surrounds the covered lagoon, and wherein a diameter of the pipe ranges from about 63 inches at the interior opening to about 36 inches at the exterior opening.

8. A lagoon entry system for providing access to a covered lagoon for cleaning purposes without having to uncover the lagoon, the covered lagoon having a cover, a floor covered by a liner, and liquid contained therein having a surface level, and gas contained therein above the surface level of the liquid, the system comprising:

a center wall;

a conduit extending through an opening in the center wall;

the conduit having an opening accessible from an exterior portion of the covered lagoon;

the conduit having a gate covering the opening;

wherein the gate provides selective access into the covered lagoon;

an interior portion of the covered lagoon;

the conduit in communication with the interior portion below the surface level of the liquid contained within the covered lagoon;

wherein the liner of the covered lagoon is sealed to the conduit;

wherein the cover of the covered lagoon is sealed to the center wall;

wherein the gate is configured to receive a submersible robot cleaner configured to clean the floor of the covered lagoon.

9. The system of claim 8, wherein the interior portion includes side walls and a bottom surface.

10. The system of claim 8, wherein the gate is controlled by a gate controller.

11. The system of claim 8, wherein the center wall is formed of concrete which is precast and transported to the site of the covered lagoon.

12. The system of claim 8, wherein the center wall is formed of concrete formed on the site of the covered lagoon.

13. The system of claim 8, wherein the gate is operably connected to the conduit.

14. The system of claim 8, wherein the gate is configured to provide selective access into the covered lagoon by moving vertically.

15. The system of claim 8, wherein the gate is configured to provide selective access into the covered lagoon by moving horizontally.

16. The system of claim 8, wherein the gate is configured to provide selective access into the covered lagoon by swinging outwardly relative to the center wall.

17. The system of claim 8, wherein material is excavated away from the exterior of the covered lagoon.

18. The system of claim 8, wherein the conduit is a pipe that extends through a berm that surrounds the covered lagoon.

19. The system of claim 8, wherein the conduit is a pipe that extends through a berm that surrounds the covered lagoon, and wherein a diameter of the pipe ranges from about 63 inches at the interior opening to about 36 inches at the exterior opening.

20. A lagoon entry system for providing access to a covered lagoon for cleaning purposes without having to uncover the lagoon, the covered lagoon having a cover, a floor covered by a liner, and liquid contained therein having a surface level, and gas contained therein above the surface level of the liquid, the system comprising:

a conduit configured to extend from an exterior portion of a berm around a periphery of the covered lagoon to an interior portion of the berm for providing communication between the exterior portion and interior portion;

a gate covering an opening of the conduit on the exterior portion for providing selective access to the interior portion of the covered lagoon;

wherein the conduit is in communication with the interior portion within the covered lagoon;

wherein the liner of the covered lagoon is sealed to the conduit;

wherein the cover of the covered lagoon is sealed to a top portion of the berm;

wherein the gate is configured to receive a submersible robot cleaner configured to clean the floor of the covered lagoon.

21. The system of claim 20, wherein the interior portion includes side walls and a bottom surface.

22. The system of claim 20, wherein the gate is controlled by a gate controller.

23. The system of claim 20, wherein material is excavated away from the exterior of the covered lagoon.

24. The system of claim 20, wherein the conduit is in communication with the interior portion below the surface level of the liquid contained within the covered lagoon.

25. A method of retrofitting a lagoon entry system to a covered lagoon, the covered lagoon having a cover, a floor covered by a liner, and liquid contained therein having a surface level, and gas contained therein above the surface level of the liquid, the method comprising:

excavating material from an interior area of the covered lagoon;

providing a center wall adjacent the interior area;

wherein the center wall includes an opening extending through the center wall;

wherein the opening in the center wall is located below the surface level of the liquid contained within the covered lagoon;

the center wall having a gate covering the opening;

wherein the gate provides selective access into the covered lagoon;

connecting an interior portion to the center wall;

wherein the interior portion of the lagoon entry system is placed on the interior area;

sealing the liner of the covered lagoon to the interior portion;

sealing the cover to the center wall; and wherein the gate is configured to receive a submersible robot cleaner configured to clean the floor of the covered lagoon.

26. The method of claim 25 wherein a hole is cut in the cover of the covered lagoon prior to excavating material from an interior area.

27. The system of claim 25, wherein material is excavated away from an exterior area of the covered lagoon.

28. The system of claim 25, wherein the interior portion is connected to an interior side of the center wall and an exterior portion is connected to an exterior side of the center wall.

29. The system of claim 25, wherein the gate is controlled by a gate controller.

30. The system of claim 25, further comprising a conduit extending through the opening of the center wall.

31. A method of retrofitting a lagoon entry system to a covered lagoon, the covered lagoon having a cover, a floor covered by a liner, and liquid contained therein having a surface level, and gas contained therein above the surface level of the liquid, the method comprising:

cutting a hole in the cover of the covered lagoon;

cutting a hole in the liner of the covered lagoon;

excavating material from a berm surrounding a perimeter of the covered lagoon;

providing a conduit within the excavated material of the berm;

wherein the conduit extends from an interior of the covered lagoon to an exterior of the covered lagoon;

wherein the conduit includes an opening at the exterior of the covered lagoon;

the conduit having a gate covering the opening;

wherein the gate provides selective access into the covered lagoon;

sealing the liner of the covered lagoon to a portion of the conduit extending into the interior of the covered lagoon;

sealing the cover to a top portion of the berm; and wherein the gate is configured to receive a submersible robot cleaner configured to clean the floor of the covered lagoon.

32. The system of claim 31, wherein the gate is controlled by a gate controller.

33. The system of claim 31, wherein the portion of the conduit extending into the interior of the covered lagoon is below the surface level of the liquid contained within the covered lagoon.

* * * * *